(12) United States Patent
Naono

(10) Patent No.: US 12,332,429 B2
(45) Date of Patent: Jun. 17, 2025

(54) OPTICAL SCANNING DEVICE AND CONTROL METHOD THEREOF

(71) Applicant: FUJIFILM Corporation, Tokyo (JP)

(72) Inventor: Takayuki Naono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 425 days.

(21) Appl. No.: 18/069,374

(22) Filed: Dec. 21, 2022

(65) Prior Publication Data

US 2023/0221547 A1 Jul. 13, 2023

(30) Foreign Application Priority Data

Jan. 11, 2022 (JP) ................. 2022-002609

(51) Int. Cl.
  *G02B 26/08* (2006.01)
  *G02B 26/10* (2006.01)

(52) U.S. Cl.
  CPC ....... *G02B 26/101* (2013.01); *G02B 26/0816* (2013.01)

(58) Field of Classification Search
  CPC .............. G02B 26/101; G02B 26/0816; G02B 26/0858; G02B 26/105; G01S 7/4817
  See application file for complete search history.

(56) References Cited

U.S. PATENT DOCUMENTS

| | | | |
|---|---|---|---|
| 2011/0141441 A1 | 6/2011 | Konno et al. | |
| 2013/0258432 A1 | 10/2013 | Aimono et al. | |
| 2013/0301103 A1* | 11/2013 | Aimono ................ | G02B 26/08 359/224.1 |

FOREIGN PATENT DOCUMENTS

| | | |
|---|---|---|
| CN | 113031003 A | 6/2021 |
| JP | 2008-170500 A | 7/2008 |

OTHER PUBLICATIONS

Extended European Search Report for corresponding European Application No. 23150249.3, dated Jun. 5, 2023.

(Continued)

*Primary Examiner* — Euncha P Cherry
(74) *Attorney, Agent, or Firm* — Birch, Stewart, Kolasch & Birch, LLP

(57) ABSTRACT

A resonance mode of one lower order than a basic resonance mode closest to a frequency of a cyclic voltage signal exists in at least any one of a plurality of resonance modes accompanied by a mirror tilt swing around a first axis or a plurality of resonance modes accompanied by the mirror tilt swing around a second axis. In a case where a resonance frequency of one higher order from a frequency of the basic resonance mode is $f_{rH}$, a ratio of a first voltage level to a second voltage level which is a maximum voltage level value in the entire frequency range among frequency components of the cyclic voltage signal is satisfied to be $-55$ dBV or less, where a maximum voltage level value in a frequency range of $(1\pm\frac{1}{20})\times f_{rL}$ and a frequency range of $(1\pm\frac{1}{20})\times f_{rH}$ among the frequency components of the cyclic voltage signal is the first voltage level for an axis in which the lower-order resonance mode exists among the first axis and the second axis, and a maximum voltage level value in the frequency range of $(1\pm\frac{1}{20})\times C_{rH}$ among the frequency components of the cyclic voltage signal is the first voltage level for an axis in which the lower-order resonance mode does not exist among the axes.

7 Claims, 14 Drawing Sheets

| | | | |
|---|---|---|---|
| FIRST AXIS | BASIC | $f_{r1}$ | 1448.2 Hz |
| | LOW ORDER | $f_{r1L}$ | 843.0 Hz |
| | HIGH ORDER | $f_{r1H}$ | 2364.5 Hz |
| SECOND AXIS | BASIC | $f_{r2}$ | 1441.0 Hz |
| | LOW ORDER | $f_{r2L}$ | NO MODE |
| | HIGH ORDER | $f_{r2H}$ | 10400.0 Hz |

(56) References Cited

OTHER PUBLICATIONS

Feng et al., "Signal-Transformation-Based Repetitive Control of Spiral Trajectory for Piezoelectric Nanopositioning Stages," IEEE/ASME Transactions on Mechatronics, vol. 25, No. 3, Jun. 2020, pp. 1634-1645.

Holmstrom et al., "MEMS Laser Scanners: A Review," Journal of Microelectromechanical Systems, vol. 23, No. 2, Apr. 2014, pp. 259-275.

* cited by examiner

FIG. 6
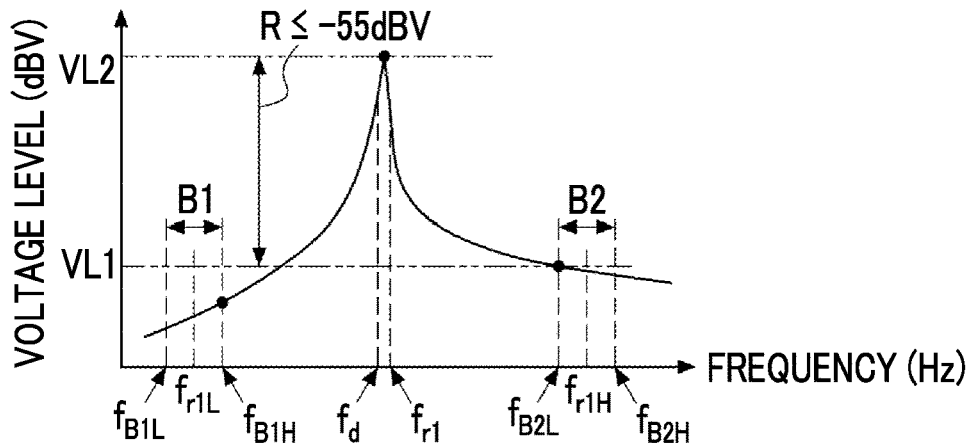
FIG. 7
| | | | |
|---|---|---|---|
| FIRST AXIS | BASIC | $f_{r1}$ | 1448.2 Hz |
| | LOW ORDER | $f_{r1L}$ | 843.0 Hz |
| | HIGH ORDER | $f_{r1H}$ | 2364.5 Hz |
| SECOND AXIS | BASIC | $f_{r2}$ | 1441.0 Hz |
| | LOW ORDER | $f_{r2L}$ | NO MODE |
| | HIGH ORDER | $f_{r2H}$ | 10400.0 Hz |
FIG. 8
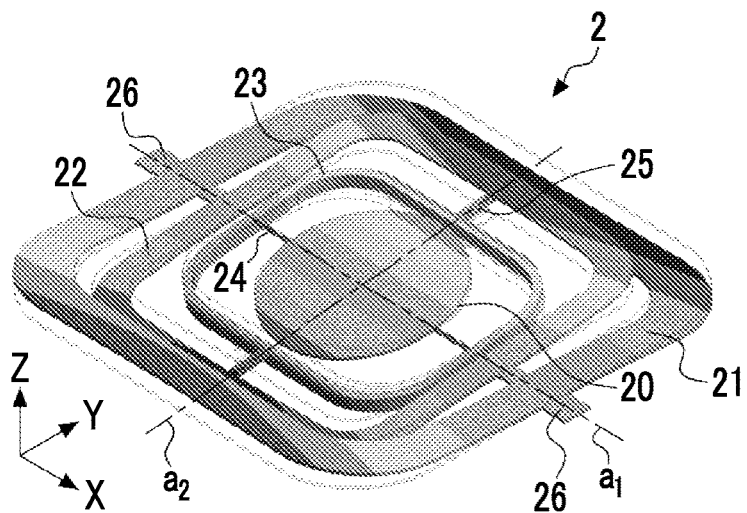

FIG. 9
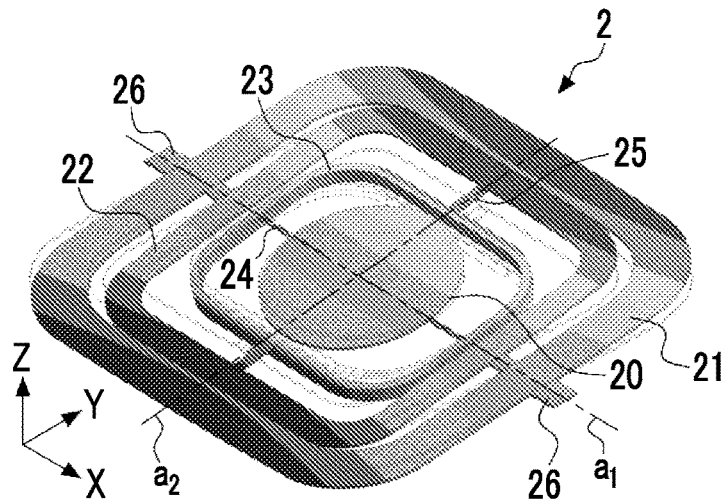
FIG. 10
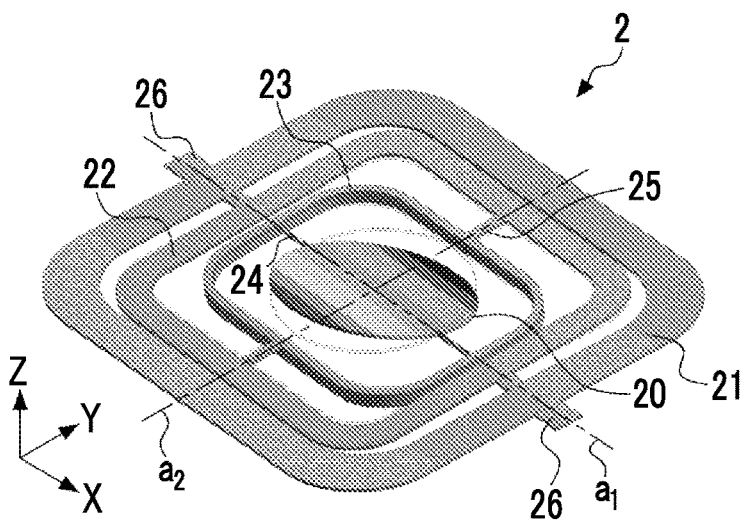
FIG. 11
| | | | |
|---|---|---|---|
| FIRST AXIS | LOWER-ORDER SIDE (FIRST FREQUENCY RANGE) | $f_{r1L}$ | 843.000 Hz |
| | | $f_{r1L}/20$ | 42.150 Hz |
| | | $f_{B1L}$ | 800.850 Hz |
| | | $f_{B1H}$ | 885.150 Hz |
| | HIGHER-ORDER SIDE (SECOND FREQUENCY RANGE) | $f_{r2L}$ | 2364.500 Hz |
| | | $f_{r2L}/20$ | 118.225 Hz |
| | | $f_{B2L}$ | 2246.275 Hz |
| | | $f_{B2H}$ | 2482.725 Hz |

FIG. 12

| CONDITION | CONTENTS OF FILTER PROCESSING | | | MAXIMUM VOLTAGE LEVEL IN ENTIRE FREQUENCY RANGE (dBV) | MAXIMUM VOLTAGE LEVEL IN FIRST FREQUENCY RANGE (dBV) | MAXIMUM VOLTAGE LEVEL IN SECOND FREQUENCY RANGE (dBV) | VOLTAGE LEVEL RATIO (dBV) | VARIATION IN LINE SPACING (deg) |
|---|---|---|---|---|---|---|---|---|
| | ORDER OF FILTER | CUTOFF FREQUENCY | | | | | | |
| | | $f_{cL}$ (Hz) | $f_{cH}$ (Hz) | | | | | |
| 1 | | NONE | | −9.53 | −51.33 | −49.44 | −39.9 | 0.3420 |
| 2 | 2 | 1000 | 1900 | −9.53 | −61.61 | −58.12 | −48.6 | 0.1100 |
| 3 | 4 | 1000 | 1900 | −9.53 | −68.29 | −65.76 | −56.2 | 0.0436 |
| 4 | 8 | 1000 | 1900 | −9.53 | −80.64 | −79.19 | −69.7 | 0.0183 |
| 5 | 2 | 1300 | 1550 | −9.54 | −81.62 | −78.52 | −69.0 | 0.0191 |
| 6 | 8 | NONE | 1900 | −9.59 | −51.29 | −61.93 | −41.7 | 0.0134 |
| 7 | 8 | NONE | 1700 | −9.80 | −51.29 | −66.00 | −41.5 | 0.0150 |

OPTICAL SCANNING DEVICE AND CONTROL METHOD THEREOF

CROSS-REFERENCE TO RELATED APPLICATIONS

The present application claims priority under 35 U.S.C. § 119 to Japanese Patent Application No. 2022-002609 filed on Jan. 11, 2022. The above application is hereby expressly incorporated by reference, in its entirety, into the present application.

BACKGROUND

1. Technical Field

The technique of the present disclosure relates to an optical scanning device and a control method thereof.

2. Description of the Related Art

In a field of light detection and ranging (LiDAR), an omnidirectional type that can obtain a 360° field of view is drawing attention. Some omnidirectional LiDAR devices are configured by combining a micro electro mechanical systems (MEMS) mirror and an omnidirectional lens. The LiDAR device using the MEMS mirror is lightweight and can be reduced in cost.

In the omnidirectional LiDAR device, the MEMS mirror needs to scan all over a donut-shaped incident surface of the omnidirectional lens with a light beam. In order to scan the above range more efficiently, the MEMS mirror desirably performs a spiral scan such that a radius vector of the light beam changes linearly over time. For this purpose, a spiral rotation operation is required in which a swing angle amplitude (hereinafter referred to as swing amplitude) of a mirror portion changes at a constant change speed. Further, in a case where such a LiDAR device is mounted on a moving body and the like, scanning of a wider range at a high frame rate is important. For this purpose, a change speed of the swing amplitude of the mirror portion is required to be increased.

JP2008-170500A describes a technique related to the spiral rotation operation of the MEMS mirror. JP2008-170500A discloses an optical scanning device comprising a swing plate, a first swing unit that causes, to the swing plate, a first swing around a first axis parallel to a plane including the swing plate, and a second swing unit that causes, to the swing plate, a second swing around a second axis that is parallel to the plane including the swing plate and perpendicular to the first axis at a frequency identical to that of the first swing and at a phase different from that of the first swing by approximately 90°. Further, JP2008-170500A discloses that a scanning position of light reflected by the swing plate is moved to draw a swirl (that is, the spiral rotation operation is performed) with increase or decrease in amplitudes of both the first swing and the second swing with time.

In the technique described in JP2008-170500A, an amplitude of a sinusoidal driving signal is caused to fluctuate over time in order to increase or decrease the amplitudes of the first swing and the second swing over time.

SUMMARY

In a case where scanning is performed by the spiral rotation operation, the line spacing of the spiral orbit corresponds to the resolution of the distance image. In order to increase the frame rate and narrow the line spacing, scanning at equal spacings without unevenness is most efficient and preferable. Therefore, the applicant suggests in JP2021-102628 that the driving signal is set as a cyclic voltage signal whose amplitude and phase change over time in order to make line spacings of the spiral orbit equal to realize the spiral rotation operation in which the radial diameter linearly changes.

However, the applicant has found that there is a problem that the line spacing (that is, resolution) varies in a specific region of the spiral orbit even though the driving signal is set as the cyclic voltage signal whose amplitude and phase change over time and thus improvement is needed. In particular, in a case where the MEMS mirror is driven by using a resonance mode in which the actuator and the mirror portion swing in a relationship of opposite phases to each other and driving efficiency is high, the variation in the line spacing becomes remarkable.

An object of the technique of the present disclosure is to provide an optical scanning device and a control method thereof capable of reducing variation in a line spacing of a spiral orbit.

In order to achieve the above object, an optical scanning device of the present disclosure is an optical scanning device comprising a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion, and a processor that provides a first driving signal to the first actuator and provides a second driving signal to the second actuator. The processor causes the mirror portion to perform a spiral rotation operation with the first driving signal and the second driving signal as cyclic voltage signals. A resonance mode of one lower order than a basic resonance mode closest to a frequency of the cyclic voltage signal exists in at least any one of a plurality of resonance modes accompanied by a mirror tilt swing around the first axis or a plurality of resonance modes accompanied by the mirror tilt swing around the second axis. In a case where a resonance frequency of one lower order from a frequency of the basic resonance mode is $f_{rL}$ and a resonance frequency of one higher order from the frequency of the basic resonance mode is $f_{rH}$ for each axis, a ratio of a first voltage level to a second voltage level which is a maximum voltage level value in the entire frequency range among frequency components of the cyclic voltage signal is satisfied to be −55 dBV or less, where a maximum voltage level value in a frequency range of $(1\pm\frac{1}{20})\times f_{rL}$ and a frequency range of $(1\pm\frac{1}{20})\times f_{rH}$ among the frequency components of the cyclic voltage signal is the first voltage level for an axis in which the lower-order resonance mode exists among the first axis and the second axis, and a maximum voltage level value in the frequency range of $(1\pm\frac{1}{20})\times f_{rH}$ among the frequency components of the cyclic voltage signal is the first voltage level for an axis in which the lower-order resonance mode does not exist among the axes.

It is preferable that in the basic resonance mode of the axis in which the lower-order resonance mode exists, an actuator that drives the mirror portion around the axis in which the lower-order resonance mode exists among the first actuator and the second actuator and the mirror portion swing in a relationship of opposite phases to each other.

It is preferable that the processor performs frequency filter processing on the first driving signal and the second driving signal to set the ratio of the first voltage level to the second voltage level to −55 dBV or less.

It is preferable that the frequency filter processing is digital filter processing or analog filter processing.

It is preferable that the cyclic voltage signal is a signal whose amplitude and phase change over time.

It is preferable that the spiral rotation operation includes a period in which a swing amplitude around the first axis and a swing amplitude around the second axis of the mirror portion linearly change, respectively.

A control method of an optical scanning device of the present disclosure is a control method of an optical scanning device that includes a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion. The control method comprises causing the mirror portion to perform a spiral rotation operation with a first driving signal applied to the first actuator and a second driving signal applied to the second actuator as cyclic voltage signals. A resonance mode of one lower order than a basic resonance mode closest to a frequency of the cyclic voltage signal exists in at least any one of a plurality of resonance modes accompanied by a mirror tilt swing around the first axis or a plurality of resonance modes accompanied by the mirror tilt swing around the second axis. In a case where a resonance frequency of one lower order from a frequency of the basic resonance mode is $f_{rL}$ and a resonance frequency of one higher order from the frequency of the basic resonance mode is $f_{rH}$ for each axis, a ratio of a first voltage level to a second voltage level which is a maximum voltage level value in the entire frequency range among frequency components of the cyclic voltage signal is satisfied to be −55 dBV or less, where a maximum voltage level value in a frequency range of $(1 \pm 1/20) \times f_{rL}$ and a frequency range of $(1 \pm 1/20) \times f_{rH}$ among the frequency components of the cyclic voltage signal being the first voltage level for an axis in which the lower-order resonance mode exists among the first axis and the second axis and a maximum voltage level value in the frequency range of $(1 \pm 1/20) \times f_{rH}$ among the frequency components of the cyclic voltage signal being the first voltage level for an axis in which the lower-order resonance mode does not exist among the axes.

According to the technique of the present disclosure, it is possible to provide an optical scanning device and a control method thereof capable of reducing the variation in the line spacing of the spiral orbit.

BRIEF DESCRIPTION OF THE DRAWINGS

Exemplary embodiments according to the technique of the present disclosure will be described in detail based on the following figures, wherein:

FIG. 4A shows a first deflection angle and FIG. 4B shows a second deflection angle, FIG. 5A shows a first driving signal and FIG. 5B shows a second driving signal, FIG. 6 is a diagram schematically showing a frequency component included in the first driving signal, FIG. 7 is a table showing measurement results of resonance frequencies in a basic resonance mode and low-order and high-order resonance modes, FIG. 8 is a diagram showing a result of calculation of a shape of the basic resonance mode among resonance modes accompanied by a mirror tilt swing around a first axis by simulation, FIG. 9 is a diagram showing a result of calculation of a shape of a resonance mode of one lower order from the basic resonance mode by simulation, FIG. 10 is a diagram showing a result of calculation of a shape of a resonance mode of one higher order from the basic resonance mode by simulation, FIG. 11 is a table showing calculation results of frequencies at a high-frequency end and a low-frequency end that define a first frequency range and a second frequency range, FIG. 12 is a table showing seven conditions used in an experiment and experimental results for each condition.

DETAILED DESCRIPTION

An example of an embodiment according to the technique of the present disclosure will be described with reference to the accompanying drawings.

Figure 1:
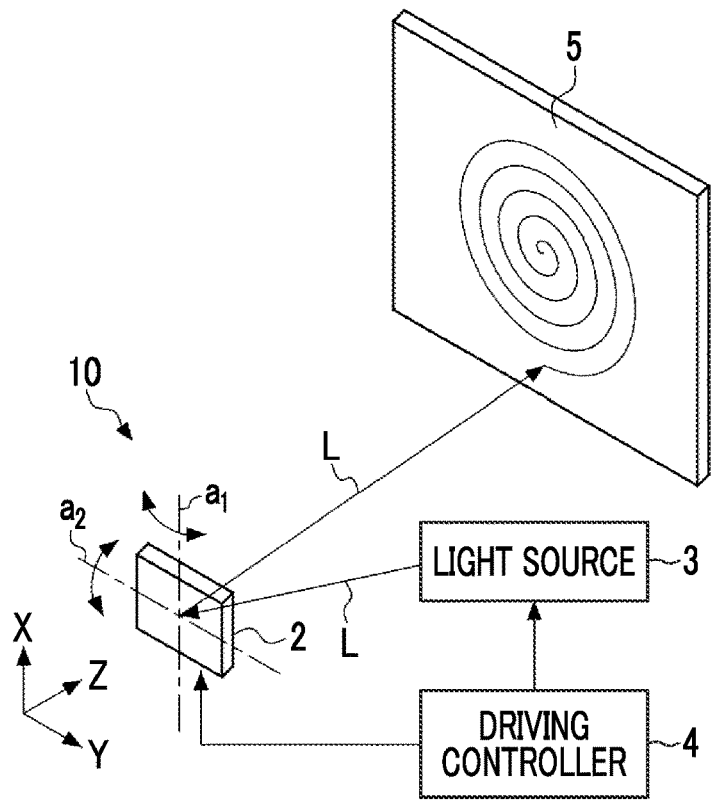
FIG. 1 is a schematic diagram of an optical scanning device.

FIG. 1 schematically shows an optical scanning device 10 according to an embodiment. The optical scanning device 10 has a MEMS mirror 2, a light source 3, and a driving controller 4. In the optical scanning device 10, under control of the driving controller 4, a light beam L emitted from the light source 3 is reflected by the MEMS mirror 2 to perform light scanning on a surface to be scanned 5. The surface to be scanned 5 is, for example, a screen. The MEMS mirror 2 is an example of a "mirror device" according to the technique of the present disclosure.

In a case where the optical scanning device 10 is applied to a LiDAR device, the MEMS mirror 2 is configured in combination with an omnidirectional lens. In this case, the MEMS mirror 2 scans a donut-shaped incident surface of the omnidirectional lens with the light beam L.

The MEMS mirror 2 is a piezoelectric two-axis driving type micromirror device that can swing a mirror portion 20 (refer to FIG. 3) around a first axis $a_1$ and a second axis $a_2$ orthogonal to the first axis $a_1$. Hereinafter, a direction parallel to the first axis $a_1$ is an X direction, a direction parallel to the second axis $a_2$ is a Y direction, and a direction orthogonal to the first axis $a_1$ and the second axis $a_2$ is a Z direction. Further, the swing of the mirror portion 20 is also referred to as a mirror tilt swing.

In the present embodiment, an example in which the first axis $a_1$ and the second axis $a_2$ are orthogonal (that is, intersect perpendicularly) is shown, but the first axis $a_1$ and the second axis $a_2$ may intersect at an angle other than 90°. In the present disclosure, orthogonal means intersecting within a certain angle range including a margin of error centered at 90°.

The light source 3 is, for example, a laser device that emits a laser beam as the light beam L. The light source 3 preferably emits the light beam L perpendicularly to a reflecting surface 20A (refer to FIG. 3) provided in the mirror portion 20 in a state where the mirror portion 20 of the MEMS mirror 2 is stationary.

The driving controller 4 outputs driving signals to the light source 3 and the MEMS mirror 2 based on optical scanning information. The light source 3 generates the light beam L based on the input driving signal and emits the generated light beam to the MEMS mirror 2. The MEMS mirror 2 swings the mirror portion 20 around the first axis $a_1$ and the second axis $a_2$ based on the input driving signal.

As will be described in detail below, the driving controller 4 causes the mirror portion 20 to perform a spiral rotation operation including a period in which a swing amplitude around the first axis $a_1$ and a swing amplitude around the second axis $a_2$ change linearly (that is, spiral rotation operation in which a radius vector changes linearly). With the spiral rotation operation of the mirror portion 20, the reflected light beam L is scanned to draw a spiral orbit (that is, a spiral curve) on the surface to be scanned 5.

Figure 2:
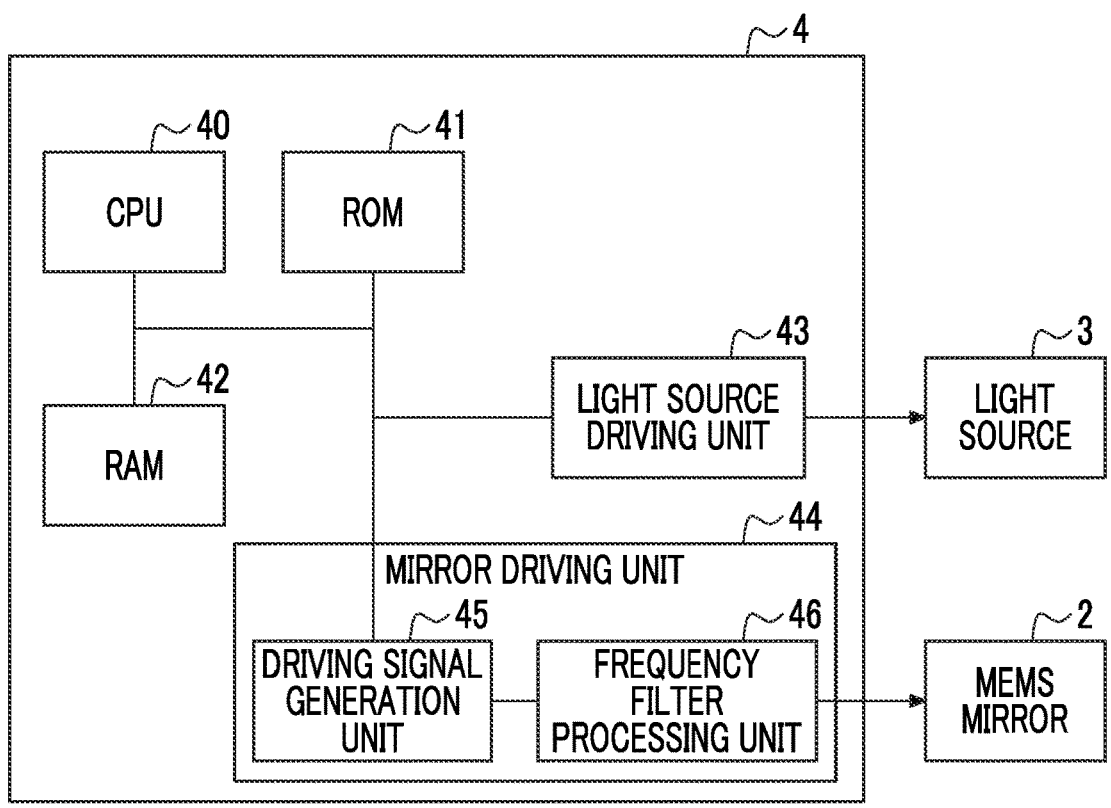
FIG. 2 is a block diagram showing an example of a hardware configuration of a driving controller.

FIG. 2 shows an example of a hardware configuration of the driving controller 4. The driving controller 4 has a central processing unit (CPU) 40, a read only memory (ROM) 41, a random access memory (RAM) 42, a light source driving unit 43, and a mirror driving unit 44.

The CPU 40 is a calculation unit that reads out a program and data from a storage device such as the ROM 41 into the RAM 42 and executes processing to realize the entire function of the driving controller 4. The CPU 40 is an example of a "processor" according to the technique of the present disclosure.

The ROM 41 is a non-volatile storage device and stores the program for the CPU 40 to execute the processing and the data such as the above-mentioned optical scanning information. The RAM 42 is a non-volatile storage device that temporarily holds the program and the data.

The light source driving unit 43 is an electric circuit that outputs the driving signal to the light source 3 under the control of the CPU 40. In the light source driving unit 43, the driving signal is a driving voltage for controlling an emission timing and emission intensity of the light source 3.

The mirror driving unit 44 is an electric circuit that outputs the driving signal to the MEMS mirror 2 under the control of the CPU 40. In the mirror driving unit 44, the driving signal is a driving voltage for controlling a timing, cycle, and deflection angle of swinging the mirror portion 20 of the mirror driving unit 44. As will be described in detail below, the driving signal includes a first driving signal and a second driving signal.

The mirror driving unit 44 includes a driving signal generation unit 45 and a frequency filter processing unit 46. The driving signal generation unit 45 generates and outputs the driving signal. For example, in the driving signal generation unit 45, the driving signal is created as a digital signal and output via a digital analog converter (DAC) and an amplification amplifier. The driving signal may be output as a stepped waveform based on the number of resolution bits of a digital signal source. Further, the driving signal can be created from a pulse signal, a bandpass filter, and the like.

The frequency filter processing unit 46 performs frequency filter processing, which will be described below, on the driving signal output from the driving signal generation unit 45. For example, the frequency filter processing unit 46 is a bandpass filter or a notch filter. The mirror driving unit 44 outputs, to the MEMS mirror 2, the driving signal generated by the driving signal generation unit 45 and subjected to the frequency filter processing by the frequency filter processing unit 46. In a case where the driving signal is the digital signal, the frequency filter processing unit 46 is a digital filter circuit that performs the digital filter processing. In a case where the driving signal is an analog signal, the frequency filter processing unit 46 is an analog filter circuit that performs the analog filter processing.

The CPU 40 controls the light source driving unit 43 and the mirror driving unit 44 based on the optical scanning information. The optical scanning information represents how to scan the surface to be scanned 5 with the light beam L. In the present embodiment, the optical scanning information represents that the light beam L is scanned to draw the spiral orbit on the surface to be scanned 5. For example, in a case where the optical scanning device 10 is applied to the LiDAR device, the optical scanning information includes a timing of emitting the light beam L for distance measurement, an emission range of the light beam, and the like.

Figure 3:
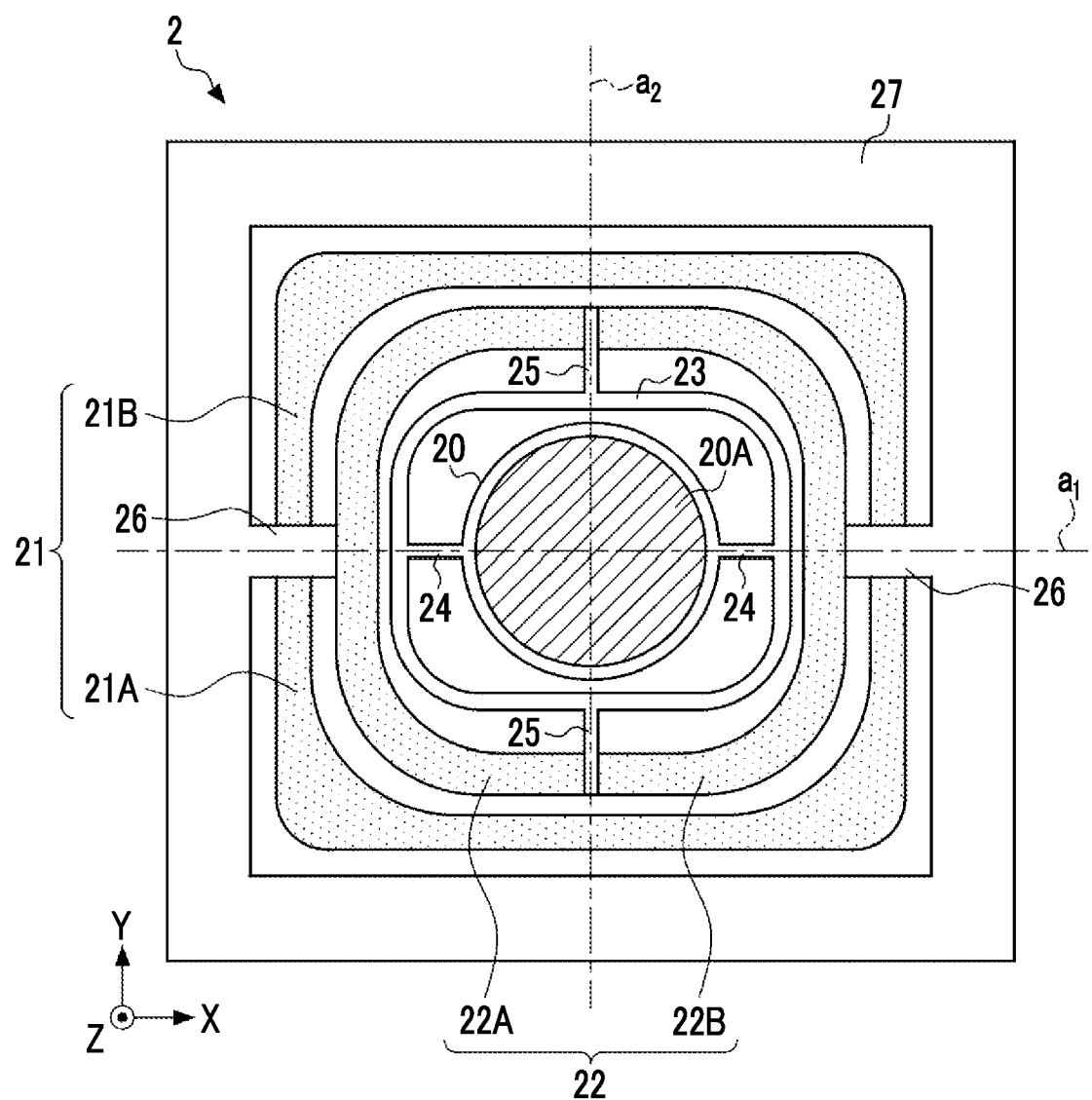
FIG. 3 is a schematic diagram of a micromirror device.

Next, an example of a configuration of the MEMS mirror 2 will be described with reference to FIG. 3. FIG. 3 is a schematic diagram of the MEMS mirror 2.

The MEMS mirror 2 has the mirror portion 20, a first actuator 21, a second actuator 22, a support frame 23, a first support portion 24, a second support portion 25, a connection portion 26, and a fixing portion 27. The MEMS mirror 2 is formed, for example, by etching a silicon-on-insulator (SOI) substrate.

The mirror portion 20 has the reflecting surface 20A reflecting incident light. The reflecting surface 20A is formed of, for example, a metal thin film such as gold (Au) or aluminum (Al) provided on one surface of the mirror portion 20. The reflecting surface 20A is, for example, circular.

The support frame 23 is disposed so as to surround the mirror portion 20. The second actuator 22 is disposed so as to surround the mirror portion 20 and the support frame 23. The first actuator 21 is disposed so as to surround the mirror portion 20, the support frame 23, and the second actuator 22.

The first support portion 24 connects the mirror portion 20 and the support frame 23 on the first axis $a_1$ and supports the mirror portion 20 swingably around the first axis $a_1$. The first axis $a_1$ is in a plane including the reflecting surface 20A in a case where the mirror portion 20 is stationary. For example, the first support portion 24 is a torsion bar extending along the first axis $a_1$.

The second support portion 25 connects the support frame 23 and the second actuator 22 on the second axis $a_2$ and supports the mirror portion 20 and the support frame 23 swingably around the second axis $a_2$. The second axis $a_2$ is orthogonal to the first axis $a_1$ in the plane including the reflecting surface 20A in a case where the mirror portion 20 is stationary.

The connection portion 26 connects the first actuator 21 and the second actuator 22 on the first axis $a_1$. Further, the connection portion 26 connects the first actuator 21 and the fixing portion 27 on the first axis $a_1$.

The fixing portion 27 has a rectangular outer shape and surrounds the first actuator 21. Lengths of the fixing portion 27 in the X direction and the Y direction are each, for example, about 1 mm to 10 mm. A thickness of the fixing portion 27 in the Z direction is, for example, about 5 μm to 0.2 mm.

The first actuator 21 and the second actuator 22 are piezoelectric actuators each provided with a piezoelectric element. The first actuator 21 applies a rotational torque around the first axis $a_1$ to the mirror portion 20. The second actuator 22 applies a rotational torque around the second axis $a_2$ to the mirror portion 20. Accordingly, the mirror portion 20 swings around the first axis $a_1$ and around the second axis $a_2$.

The first actuator 21 is an annular thin plate member that surrounds the mirror portion 20, the support frame 23, and the second actuator 22 in an XY plane. The first actuator 21 is configured of a pair of a first movable portion 21A and a second movable portion 21B. The first movable portion 21A and the second movable portion 21B are each semi-annular. The first movable portion 21A and the second movable portion 21B have a shape that is axisymmetric with respect to the first axis $a_1$ and are connected on the first axis $a_1$.

The support frame 23 is an annular thin plate member that surrounds the mirror portion 20 in the XY plane.

The second actuator 22 is an annular thin plate member that surrounds the mirror portion 20 and the support frame 23 in the XY plane. The second actuator 22 is configured of a pair of a first movable portion 22A and a second movable portion 22B. The first movable portion 22A and the second movable portion 22B are each semi-annular. The first movable portion 22A and the second movable portion 22B have a shape that is axisymmetric with respect to the second axis $a_2$ and are connected on the second axis $a_2$.

In the first actuator 21, the first movable portion 21A and the second movable portion 21B are each provided with piezoelectric elements. In the second actuator 22, the first movable portion 22A and the second movable portion 22B are each provided with piezoelectric elements.

In the present example, the first actuator 21 and the second actuator 22 are each configured as separate annular structures, but the present disclosure is not limited thereto. The first actuator 21 and the second actuator 22 may be configured to coexist in one structure. For example, piezoelectric bodies are disposed into one annular structure in a divided manner. The first driving signal and the second driving signal are provided to two piezoelectric parts separated by the division in this manner, and thus the mirror tilt swings around the first axis $a_1$ and around the second axis $a_2$ can be realized.

Figure 4A:
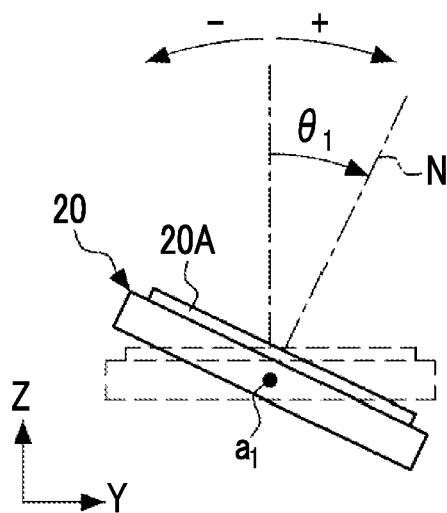
FIGS. 4A and 4B are diagrams for describing deflection angles in a case where a mirror portion swings, where
Figure 4B:
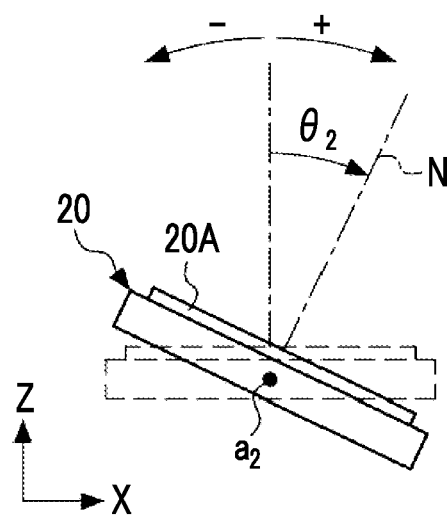

FIGS. 4A and 4B describe deflection angles in a case where the mirror portion 20 swings. FIG. 4A shows a deflection angle (hereinafter referred to as a first deflection angle) $θ_1$ around the first axis $a_1$ of the mirror portion 20. FIG. 4B shows a deflection angle (hereinafter referred to as a second deflection angle) $θ_2$ around the second axis $a_2$ of the mirror portion 20.

As shown in FIG. 4A, the first deflection angle $θ_1$ is an angle at which a normal line N of the reflecting surface 20A of the mirror portion 20 is inclined in a YZ plane. The first deflection angle $θ_1$ takes a positive value in a case where the normal line N of the reflecting surface 20A is inclined in a +Y direction, and the first deflection angle $θ_1$ takes a negative value in a case where the normal line N thereof is inclined in a —Y direction.

The first deflection angle $θ_1$ is controlled by a driving signal (hereinafter referred to as a first driving signal) provided to the first actuator 21 by the driving controller 4. The first driving signal is, for example, a sinusoidal alternating voltage. The first driving signal includes a driving voltage waveform $V_{1A}(t)$ applied to the first movable portion 21A and a driving voltage waveform $V_{1B}(t)$ applied to the second movable portion 21B. The driving voltage waveform $V_{1A}(t)$ and the driving voltage waveform $V_{1B}(t)$ are out of phase with each other (that is, phase difference is 180°).

As shown in FIG. 4B, the second deflection angle $θ_2$ is an angle at which the normal line N of the reflecting surface 20A of the mirror portion 20 is inclined in an XZ plane. The second deflection angle $θ_2$ takes a positive value in a case where the normal line N of the reflecting surface 20A is inclined in a +X direction, and the second deflection angle $θ_2$ takes a negative value in a case where the normal line N thereof is inclined in a −X direction.

The second deflection angle $θ_2$ is controlled by a driving signal (hereinafter referred to as a second driving signal) provided to the second actuator 22 by the driving controller 4. The second driving signal is, for example, a sinusoidal alternating voltage. The second driving signal includes a driving voltage waveform $V_{2A}(t)$ applied to the first movable portion 22A and a driving voltage waveform $V_{2B}(t)$ applied to the second movable portion 22B. The driving voltage waveform $V_{2A}(t)$ and the driving voltage waveform $V_{2B}(t)$ are out of phase with each other (that is, phase difference is 180°).

Figure 5A:
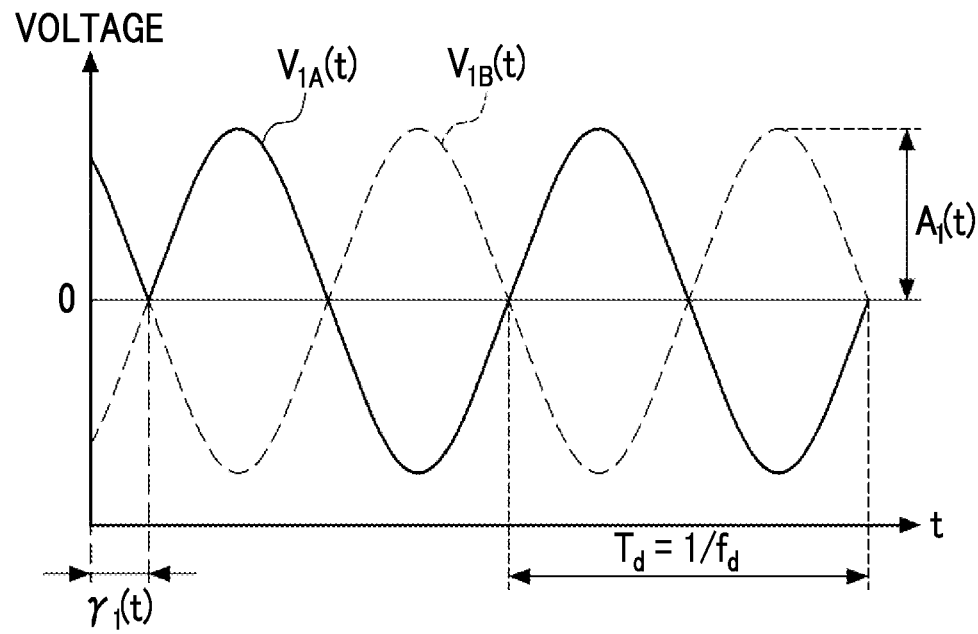
FIGS. 5A and 5B are diagrams showing examples of driving signals applied to a first actuator and a second actuator, where
Figure 5B:
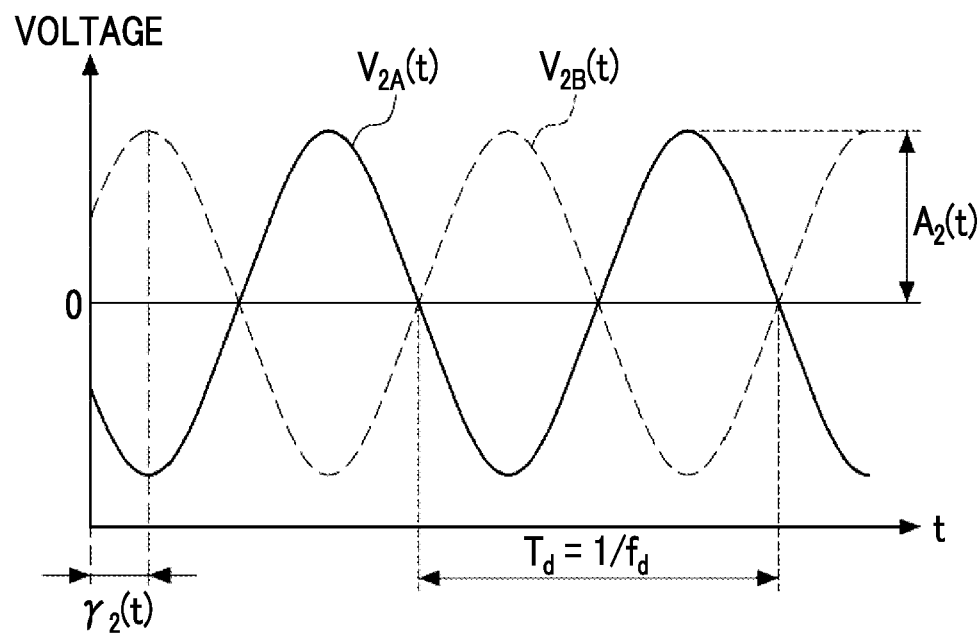

FIGS. 5A and 5B show examples of the driving signals provided to the first actuator 21 and the second actuator 22. FIG. 5A shows the driving voltage waveforms $V_{1A}(t)$ and $V_{1B}(t)$ included in the first driving signal. FIG. 5B shows the driving voltage waveforms $V_{2A}(t)$ and $V_{2B}(t)$ included in the second driving signal.

The driving voltage waveforms $V_{1A}(t)$ and $V_{1B}(t)$ are each represented by the following equations (1A) and (1B).

[Formula 1]

$$V_{1A}(t)=A_1(t)\sin(2\pi f_d t+\gamma_1(t)) \quad (1A)$$

[Formula 2]

$$V_{1B}(t)=A_1(t)\sin(2\pi f_d t+\gamma_1(t)+\pi) \quad (1B)$$

Here, t is a time. $f_d$ is a driving frequency. $A_1(t)$ is amplitude and changes over time t. $\gamma_1(t)$ is phase and changes over time t. The phase difference between the driving voltage waveform $V_{1A}(t)$ and the driving voltage waveform $V_{1B}(t)$ is $\pi$ (that is, 180°).

That is, the first driving signal is a cyclic voltage signal whose amplitude and phase change over time. The driving voltage waveforms $V_{1A}(t)$ and $V_{1B}(t)$ are each applied to the first movable portion 21A and the second movable portion 21B to swing the mirror portion 20 around the first axis $a_1$ in a cycle $T_d(=1/f_d)$.

The driving voltage waveforms $V_{2A}(t)$ and $V_{2B}(t)$ are each represented by the following equations (2A) and (2B).

[Formula 3]

$$V_{2A}(t)=A_2(t)\sin(2\pi f_d t+\gamma_2(t)+\varphi) \quad (2A)$$

[Formula 4]

$$V_{2B}(t)=A_2(t)\sin(2\pi f_d t+\gamma_2(t)+\varphi+\pi) \quad (2B)$$

Here, t is a time. $f_d$ is a driving frequency. $A_z(t)$ is amplitude and changes over time t. $\gamma_z(t)$ is phase and changes over time t. The phase difference between the driving voltage waveform $V_{2A}(t)$ and the driving voltage waveform $V_{2B}(t)$ is $\pi$ (that is, 180°).

That is, the second driving signal is the cyclic voltage signal whose amplitude and phase change over time. The driving voltage waveforms $V_{2A}(t)$ and $V_{2B}(t)$ are each applied to the first movable portion 22A and the second movable portion 22B to swing the mirror portion 20 around the second axis $a_2$ in the cycle $T_d$ $(=1/f_d)$.

Further, $\gamma$ is the phase difference between the driving voltage waveforms $V_{1A}(t)$ and $V_{1B}(t)$ and the driving voltage waveforms $V_{2A}(t)$ and $V_{2B}(t)$. In the present embodiment, $\gamma=\pi/2$ (that is, 90°) in order to cause the mirror portion 20 to perform a circular spiral scan operation. Accordingly, the spiral scan operation in which the cycle of one round of a circular orbit is $T_d$ $(=1/f_d)$ is realized. A value of $\gamma$ may be set to a value other than $\pi/2$. In a case where $\varphi$ is the value other than $\pi/2$, the mirror portion 20 performs an elliptical spiral scan operation.

The amplitude $A_1(t)$ and phase $\gamma_1(t)$ of the first driving signal are each represented by polynomials indicated by the following equations (3) and (4). The amplitude $A_2(t)$ and phase MO of the second driving signal are each represented by polynomials indicated by the following equations (5) and (6). In the present embodiment, the polynomial is a secondary function, but may be a cubic or more function. A degree of the polynomial is determined by a required accuracy of the spiral scan operation and calculation power of the processor. $m_{kp}$ and $n_{kp}$ are coefficients. Here, k is 0, 1, or 2. p is a orb. In the present embodiment, the phase $\gamma_2(t)$ is represented by a polynomial including the phase difference $\varphi$.

[Formula 5]

$$A_1(t)=m_{2a}t^2+m_{1a}t+m_{0a} \quad (3)$$

[Formula 6]

$$\gamma_1(t)=n_{2a}t^2+n_{1a}t+n_{0a} \quad (4)$$

[Formula 7]

$$A_2(t)=m_{2b}t^2+m_{1b}t+m_{0b} \quad (5)$$

[Formula 8]

$$\gamma_2(t)+\varphi=n_{2b}t^2+n_{1b}t+n_{0b} \quad (6)$$

The coefficients $m_{kp}$ and $n_{kp}$ are determined such that the swing amplitude around the first axis $a_1$ and the swing amplitude around the second axis $a_2$ of the mirror portion 20 change linearly over time (that is, the radius vector of the spiral orbit changes at a constant change speed). The swing amplitude around the first axis $a_1$ corresponds to a maximum value and a minimum value of the first deflection angle $\theta_i$. The swing amplitude around the second axis $a_z$ corresponds to a maximum value and a minimum value of the second deflection angle $\theta 2$.

For example, the coefficients $m_{kp}$ and $n_{kp}$ are determined by a method in which the driving controller 4 actually inputs the first driving signal and the second driving signal to the MEMS mirror 2 and adjustment is performed while checking the first deflection angle $\theta_1$ and the second deflection angle $\theta_2$ of the mirror portion 20 with a sensor or the like.

As the sensor to detect the deflection angle, there is a method of detecting, with an optical sensor, reflected light of the light beam L, which is emitted from the light source 3 installed outside the MEMS mirror 2 and reflected by the mirror portion 20, a method of incorporating, on the MEMS mirror 2, a strain sensor or the like that generates a voltage according to a stress, and the like.

As described above, the applicant suggests in JP2021-102628 that the coefficients $m_{kp}$ and $n_{kp}$ related to the changes in the amplitude and the phase over time are appropriately determined with the first driving signal and the second driving signal as the cyclic voltage signals whose amplitudes and phases change over time, respectively.

The amplitudes $A_1(t)$ and $A_2(t)$ and the phases $\gamma_1(t)$ and $\gamma_2(t)$ are cyclic functions with a modulation cycle $T_m$ as a unit. In a case where the optical scanning device 10 is applied to the LiDAR device that acquires a distance image, the modulation cycle $T_m$ corresponds to a frame rate of the distance image. In a case where the LiDAR device is mounted on a moving body such as a drone, the modulation cycle $T_m$ is desirably as small as possible. In this case, for example, the frame rate is required to be at least 10 Hz or higher, preferably 20 Hz or higher. That is, the modulation cycle $T_m$ is required to be at least 0.1 seconds or less, preferably 0.05 seconds or less.

A line spacing of the spiral orbit corresponds to a resolution of the distance image. In order to increase the frame rate and narrow the line spacing, scanning at equal spacings without unevenness is most efficient and preferable. The line spacing means a spacing in a radial direction of the spiral orbit. In the present embodiment, the spiral rotation operation in which the radius vector changes linearly is realized in order to make line spacings of the spiral orbit equal.

In the present embodiment, the radius vector of the spiral orbit is expanded and contracted in one modulation cycle $T_m$. That is, one modulation cycle $T_m$ includes an expansion period TE and a contraction period TS. The expansion period TE is a period in which the swing amplitude around the first axis $a_1$ and the swing amplitude around the second axis $a_2$ increase linearly. The contraction period TS is a period in which the swing amplitude around the first axis $a_1$ and the swing amplitude around the second axis $a_2$ decrease linearly.

The MEMS mirror 2 has a resonance mode frequency (hereinafter referred to as first resonance frequency $f_{r1}$) accompanied by the mirror tilt swing around the first axis $a_1$ of the mirror portion 20 and a resonance mode frequency (hereinafter referred to as second resonance frequency $f_{r2}$) accompanied by the mirror tilt swing around the second axis $a_2$ of the mirror portion 20. Here, the first resonance frequency $f_{r1}$ is the resonance frequency of a basic resonance mode closest to the driving frequency $f_d$ among a plurality of resonance modes accompanied by the mirror tilt swing around the first axis $a_1$. Further, the second resonance frequency $f_{r2}$ is a resonance frequency of a basic resonance mode closest to the driving frequency $f_d$ among a plurality of resonance modes accompanied by the mirror tilt swing around the second axis $a_2$.

The first resonance frequency $f_{r1}$ is a driving frequency $f_d$ at which the swing amplitude is maximized in a case where the driving frequency $f_d$ is swept in a state where the mirror portion 20 is caused to swing around the first axis $a_1$. The second resonance frequency $f_d$ is a driving frequency $f_d$ at which the swing amplitude is maximized in a case where the driving frequency $f_d$ is swept in a state where the mirror portion 20 is caused to swing around the second axis $a_2$.

It is preferable that the MEMS mirror 2 is designed such that the first resonance frequency $f_{r1}$ substantially matches the second resonance frequency $f_{r2}$ and the driving frequency $f_d$ is set to a value that substantially matches the first resonance frequency $f_{r1}$ and the second resonance frequency $f_{r2}$. However, in reality, the first resonance frequency $f_{r1}$ and the second resonance frequency $f_{r2}$ may not match due to a process error, temperature dependence, changes in characteristics over time, and the like of the MEMS mirror 2.

The applicant has found that there is a problem that the line spacing (that is, resolution) varies in a specific region of the spiral orbit even though the driving signal is set as the cyclic voltage signal whose amplitude and phase change over time and thus improvement is needed. It is considered that the cycle of the spiral rotation operation is lengthened to reduce the variation in the line spacing of the spiral orbit. However, in a case where the cycle of the spiral rotation operation is lengthened, the frame rate of the distance image is lowered.

The applicant has found that the variation occurring in the line spacing of the spiral orbits is caused by the excitation of unnecessary low-order and high-order resonance modes than the basic resonance mode during the driving. Furthermore, the applicant has found that an unnecessary resonance mode accompanied by the mirror tilt swing between the first axis $a_t$ and the second axis $a_2$ causes the variation in the line spacing. Therefore, in each axis, a frequency component included in a frequency range of $\pm(f_r/Q)/2$ about a resonance frequency $f_r$ of the unnecessary low-order and high-order resonance modes is suppressed to suppress the excitation of the unnecessary resonance mode and to reduce the variation in line spacing. Q represents the resonance Q value. The resonance Q value of the MEMS mirror 2 in the resonance mode accompanied by the mirror tilt swing is generally 10 or more. Therefore, in the present embodiment, with suppression of a frequency component included in a frequency range of $\pm f_r/20$ about the resonance frequency $f_r$ of the unnecessary low-order and high-order resonance modes, the robustness is improved even for the variation in the Q value of the unnecessary mode due to a dimensional change, a manufacturing variation, or the like.

With the suppression of the frequency components in the frequency range from the first driving signal and the second driving signal by the frequency filter processing unit 46, it is possible to reduce the variation in the line spacing of the spiral orbit without lowering the frame rate. Specifically, first, with suppression of the frequency components in a first frequency range B1 including a resonance frequency of one lower order from the frequency of the basic resonance mode, which is closest to the frequency of the cyclic voltage signal (that is, driving frequency $f_d$), and in a second frequency range B2 including a resonance frequency of one higher order from the frequency of the basic resonance mode, among the plurality of resonance modes accompanied by the mirror tilt swing around the first axis $a_1$, the variation in the line spacing caused by the unnecessary vibration around the first axis $a_1$ is reduced. Secondly, with suppression of the frequency components in the first frequency range B1 including a resonance frequency of one lower order from the frequency of the basic resonance mode, which is closest to the frequency of the cyclic voltage signal (that is, driving frequency $f_d$), and in the second frequency range B2 including a resonance frequency of one higher order from the frequency of the basic resonance mode, among the plurality of resonance modes accompanied by the mirror tilt swing around the second axis $a_2$, the variation in the line spacing caused by the unnecessary vibration around the second axis $a_z$ is reduced. In a case where the low-order resonance mode does not exist (that is, a case where the first frequency range B1 does not exist), only the frequency component in the second frequency range B2 may be suppressed.

FIG. 6 schematically shows the frequency component included in the first driving signal. In FIG. 6, $f_{r1L}$ represents a resonance frequency of one lower order from the first resonance frequency $f_{r1}$. $f_{r1H}$ represents a resonance frequency of one higher order from the first resonance frequency $f_{r1}$. The first frequency range B1 is a range defined by $f_{B1L} \leq B1 \leq f_{B1H}$. Here, $f_{B1L}=(1-\frac{1}{20}) \times f_{r1L}$, and $f_{B1H}=(1+\frac{1}{20}) \times f_{r1L}$. That is, the first frequency range B1 is a frequency range of $(1\pm\frac{1}{20}) \times f_{r1L}$. The second frequency range B2 is a range defined by $f_{B2L} \leq B2 \leq f_{B2H}$. $f_{B2L}=(1-\frac{1}{20}) \times f_{r1H}$ and $f_{B2H}=(1+\frac{1}{20}) \times f_{r1H}$. That is, the second frequency range B2 is a frequency range of $(1\pm\frac{1}{20}) \times f_{r1H}$.

In FIG. 6, VL1 is a maximum voltage level value (hereinafter referred to as first voltage level) in the first frequency range B1 and the second frequency range B2 among the frequency components of the first driving signal. VL2 is a maximum voltage level value (hereinafter referred to as second voltage level) in the entire frequency range among the frequency components of the first driving signal. The frequency filter processing unit 46 performs the filter processing on the first driving signal such that a ratio R (hereinafter referred to as voltage level ratio R) of the first voltage level VL1 to the second voltage level VL2 is −55 dBV or less.

The same applies to the second driving signal. The frequency filter processing unit 46 performs the filter processing on the second driving signal such that the voltage level ratio R is −55 dBV or less.

For an axis in which a resonance mode of one lower order than the basic resonance mode exists among the first axis $a_1$ and the second axis $a_2$, the maximum voltage level value in the first frequency range B1 and the second frequency range B2 among the frequency components of the cyclic voltage signal is the first voltage level VL1. On the other hand, for an axis in which the resonance mode of one lower order than the basic resonance mode does not exist, the maximum voltage level value in the second frequency range B2 among the frequency components of the cyclic voltage signal is the first voltage level VL1.

The first frequency range B1 and the second frequency range B2 may be a range determined based on any one of the first resonance frequency $f_{r1}$ or the second resonance frequency $f_{r2}$. Further, the frequency filter processing unit 46 may be designed such that the voltage level ratio R of any one of the first driving signal or the second driving signal is −55 dBV or less. For example, the frequency filter processing unit 46 may be designed such that the voltage level ratio R is −55 dBV or less for the first driving signal and may perform the same filter processing on the second driving signal as on the first driving signal.

Experimental Results

The following shows results of an experiment on dependence of the variation in the line spacing of the spiral orbit on the filter processing.

First, the resonance frequency of the MEMS mirror 2 is measured by the following method. A sinusoidal voltage signal is input only to the first actuator 21 to cause the mirror portion 20 to swing around the first axis $a_1$, and a frequency at which the swing amplitude is maximized in a case where a frequency of the sinusoidal wave (that is, driving frequency $f_d$) is changed is set as the first resonance frequency $f_{r1}$. Similarly, a sinusoidal voltage signal is input only to the second actuator 22 to cause the mirror portion 20 to swing around the second axis $a_2$, and a frequency at which the swing amplitude is maximized in a case where a frequency of the sinusoidal wave (that is, driving frequency $f_d$) is changed is set as the second resonance frequency $f_{r2}$.

Further, the spiral rotation operation of the mirror portion 20 is an operation in which the swing amplitude around the first axis $a_1$ and the swing amplitude around the second axis $a_2$ are each changed over time in a range from a first value to a second value (for example, from 5° up to 10°). Here, the second value is larger than the first value. In the present disclosure, the resonance frequency in a case where the swing amplitude around the first axis $a_1$ is the second value is defined as the first resonance frequency $f_{r1}$. Further, the resonance frequency in a case where the swing amplitude around the second axis $a_2$ is the second value is defined as the second resonance frequency $f_{r2}$.

Next, the low-order and high-order resonance frequencies $f_{r1L}$ and $f_{r1H}$ with respect to the first resonance frequency $f_{r1}$ and the low-order and high-order resonance frequencies $f_{r2L}$ and $f_{r2H}$ with respect to the second resonance frequency $f_{r2}$ are measured. A vibration analyzer (Polytec MSA-500) to which a laser Doppler measurement device is applied can be used for measuring these resonance frequencies. A charm voltage waveform or a noise voltage waveform is input to each of the first actuator 21 and the second actuator 22 and a surface of the MEMS mirror 2 is measured at multiple points by laser Doppler vibration analysis to visualize a vibration shape in an out-of-plane direction.

It is also possible to measure the resonance frequencies $f_{r1L}$, $f_{r1H}$, $f_{r2L}$, and $f_{r2H}$ by the same measurement method as that of the first resonance frequency $f_{r1}$ and the second resonance frequency $f_{r2}$. The low-order resonance frequencies $f_{r1L}$ and $f_{r2L}$ can be measured by widely searching for a frequency region lower than each of the first resonance frequency $f_{r1}$ and the second resonance frequency $f_{r2}$. Further, the high-order resonance frequencies $f_{r1H}$ and $f_{r2H}$ can be measured by widely searching for a frequency region higher than each of the first resonance frequency $f_{r1}$ and the second resonance frequency $f_{r2}$.

FIG. 7 shows measurement results of the resonance frequencies in the basic resonance mode and the low-order and high-order resonance modes. Measured values of the low-order and high-order resonance frequencies $f_{r1L}$, $f_{r1H}$, $f_{r2L}$, and $f_{r2H}$ shown in FIG. 7 are measured by the same measurement method as that of the first resonance frequency $f_{r1}$ and the second resonance frequency $f_{r2}$.

The first resonance frequency $f_{r1}$ is 1448.2 Hz. The second resonance frequency $f_{r2}$ is 1441.0 Hz. Further, the resonance mode accompanied by the mirror tilt swing around the first axis $a_1$ exists on a lower-order side and a higher-order side of the basic resonance mode, and the resonance frequencies $f_{r1L}$ and $f_{r1H}$ are respectively 843.0 Hz and 2364.5 Hz. Further, the resonance mode accompanied by the mirror tilt swing around the second axis $a_2$ exists on the higher-order side of the basic resonance mode, but does not exist on the lower-order side. The resonance frequency $f_{r2H}$ on the higher-order side is 10400.0 Hz.

Next, various resonance modes will be described in detail. FIG. 8 shows a result of calculation of a shape of the basic resonance mode among the resonance modes accompanied by the mirror tilt swing around the first axis $a_1$ by simulation. In this basic resonance mode, the first actuator 21 and the mirror portion 20 swing around the first axis $a_1$ in a relationship of opposite phases to each other. In this manner, in a case where the first actuator 21 and the mirror portion 20 swing in opposite phases to each other, leakage of vibration energy to the fixing portion 27 is suppressed. Accordingly, it is possible to drive the MEMS mirror 2 efficiently and with low power consumption.

FIG. 9 shows a result of calculation of a shape of the resonance mode of one lower order from the basic resonance mode by simulation. In this low-order resonance mode, the first actuator 21 and the mirror portion 20 swing around the first axis $a_1$ in a relationship of the same phase with each other. As described above, in a case where the first actuator 21 and the mirror portion 20 swing in the relationship of the same phase with each other, the vibration energy leaks to the fixing portion 27, and thus the driving efficiency is relatively poor. Further, FIG. 10 shows a result of calculation of a shape of a resonance mode of one higher order from the basic resonance mode by simulation.

Next, in order to investigate a difference in the driving efficiency between the basic resonance mode and the low-order resonance mode, a sinusoidal signal with the resonance frequency $f_{r1}$ as the driving frequency $f_d$ is input to the first actuator 21 to excite the basic resonance mode shown in FIG. 8 and one-dimensional scan is performed to investigate a relationship between the first deflection angle $\theta_1$ of the mirror portion 20 and the driving voltage (amplitude of the driving signal). In this case, $\theta_1=5°$ in a case where the driving voltage is 4 Vpp. Further, a sinusoidal signal with the resonance frequency $f_{r1L}$ as the driving frequency $f_d$ is input to the first actuator to excite the low-order resonance mode shown in FIG. 9. In this case, $\theta_1=2.2°$ in a case where the driving voltage is 4 Vpp.

In this manner, with the use of the resonance mode in which the first actuator 21 and the mirror portion 20 swing in the relationship of opposite phases to each other, it is possible to drive the MEMS mirror 2 with a low driving voltage and thus to realize the low power consumption and a high scan angle even in a case where the mirror portion 20 is caused to perform the spiral scan operation. However, in general, such a resonance mode is not a lowest-order resonance mode among many resonance modes around the first axis $a_1$. Therefore, at least another resonance mode in which the first actuator 21 and the mirror portion 20 swing in the relationship of the same phase with each other always exists on a low-frequency side. In the present disclosure, it has been found that in a case where the mirror portion 20 is caused to perform the spiral scan operation, not only the resonance mode on a higher-frequency side than the basic resonance mode but also the resonance mode on the low-frequency side as shown in FIG. 9 has a large influence on the variation in the line spacing.

According to the technique of the present disclosure, with removal of both components on the low-frequency side and the high-frequency side from the driving signal, it is possible to realize the spiral scan operation in which the line spacings are the same while using a highly efficient drive mode.

In the basic resonance mode of the axis in which the resonance mode of one lower order than the basic resonance mode exists, it is preferable that an actuator that drives the mirror portion 20 around the axis in which the lower-order resonance mode exists among the first actuator 21 and the second actuator 22 and the mirror portions 20 swing in the relationship of opposite phases with each other. In the example shown in FIG. 7, it is preferable that the first actuator 21 that drives the mirror portion 20 around the first axis $a_1$ in which at least the resonance mode of one lower order than the basic resonance mode exists and the mirror portion 20 swing in the relationship of opposite phases with each other.

Next, for the resonance mode accompanied by the mirror tilt swing around the first axis $a_1$ in which the resonance mode exists on the lower-order side and the higher-order side of the basic resonance mode, the first frequency range B1 and second frequency range B2 described above are calculated. FIG. 11 shows calculation results of the frequencies $f_{B1L}$ and $f_{B1H}$ that define the first frequency range B1 and the frequencies $f_{B2L}$ and $f_{B2H}$ that define the second frequency range B2.

In the present experiment, the first driving signal and the second driving signal, which are cyclic voltage signals whose amplitude and phase change over time, are applied to the MEMS mirror 2 to cause the mirror portion 20 to perform the spiral rotation operation. In a state where the mirror portion 20 performs the spiral rotation operation, the light beam L is emitted from the light source 3 to the mirror portion 20. The light beam L reflected by the mirror portion 20 is incident on a position sensor diode (PSD) element, and a voltage signal output from the PSD element is converted into an incident position of the light beam L to measure the variation in the line spacing of the spiral orbit.

In the present experiment, with a change in contents of the filter processing by the frequency filter processing unit 46 to change the voltage level ratio R described above, the dependence of the variation in the line spacing of the spiral orbit on the voltage level ratio R is evaluated. In the present experiment, the driving frequency $f_d$ is set to 1456 Hz.

FIG. 12 shows seven conditions used in the present experiment and experimental results for each condition. Condition 1 means that the filter processing is not performed on the first driving signal and the second driving signal. In Conditions 2 to 5, the frequency filter processing unit 46 is a Butterworth bandpass filter, and any one of an order of the bandpass filter or cutoff frequencies $f_{cL}$ and $f_{cH}$ is different. $f_{cL}$ is a cutoff frequency at a low-frequency end of a pass band. $f_{cH}$ is a cutoff frequency at a high-frequency end of the pass band. In Conditions 6 and 7, the frequency filter processing unit 46 is a Butterworth low-pass filter, and the cutoff frequency $f_{cH}$ is different. Under Conditions 6 and 7, in the frequency filter processing unit 46, a frequency band equal to or lower than the cutoff frequency $f_{cH}$ is the pass band.

The mirror portion 20 is caused to perform the spiral rotation operation based on each of Conditions 1 to 7, and evaluation is made for the maximum voltage level in the entire frequency range, the maximum voltage level in the first frequency range B1, the maximum voltage level in the second frequency range B2, the voltage level ratio R, and the variation in the line spacing, among the frequency components of the first driving signal. The maximum voltage level in the entire frequency range corresponds to the second voltage level VL2 described above. A larger one of the maximum voltage level in the first frequency range B1 and the maximum voltage level in the second frequency range B2 corresponds to the first voltage level VL1 described above. The variation in the line spacing is represented by a tilt angle of the mirror portion 20.

Figure 13:
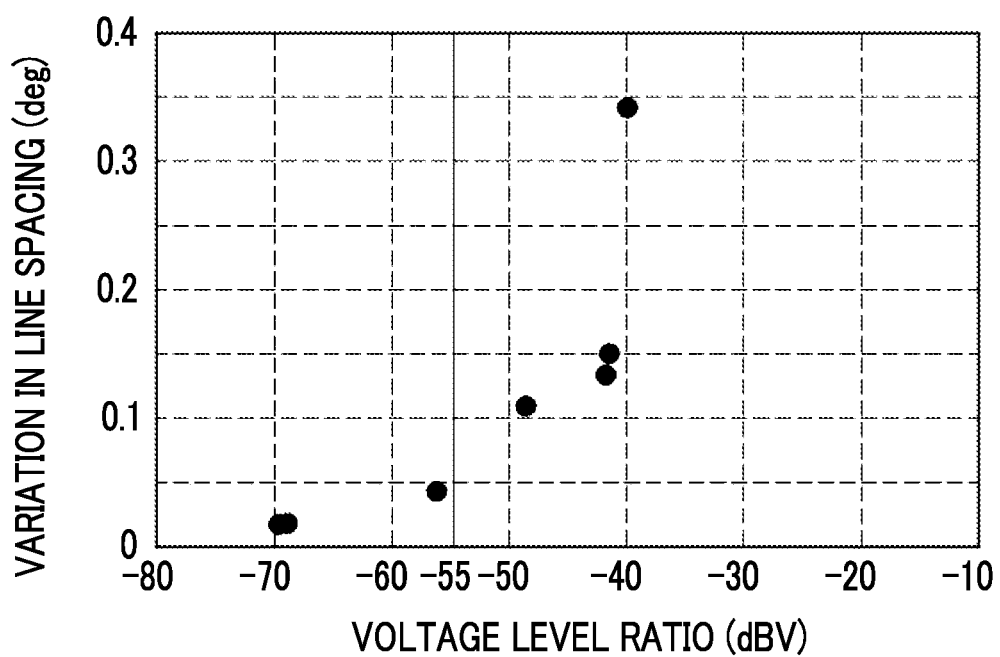
FIG. 13 is a graph showing a relationship between a voltage level ratio and variation in a line spacing.

FIG. 13 is a graph showing a relationship between the voltage level ratio R and the variation in line spacing shown in FIG. 12. According to FIG. 13, it can be seen that the variation in the line spacing is smaller (that is, resolution is improved) as the voltage level ratio R is lower. In particular, in a case where the voltage level ratio R is −55 dBV or less, the variation in line spacing is 0.05° or less. The variation in the line spacing of 0.05° corresponds to about half of a line spacing of an ideal spiral orbit, and a sufficient resolution can be obtained.

Details of Experimental Results Under Condition 1

Figure 14:
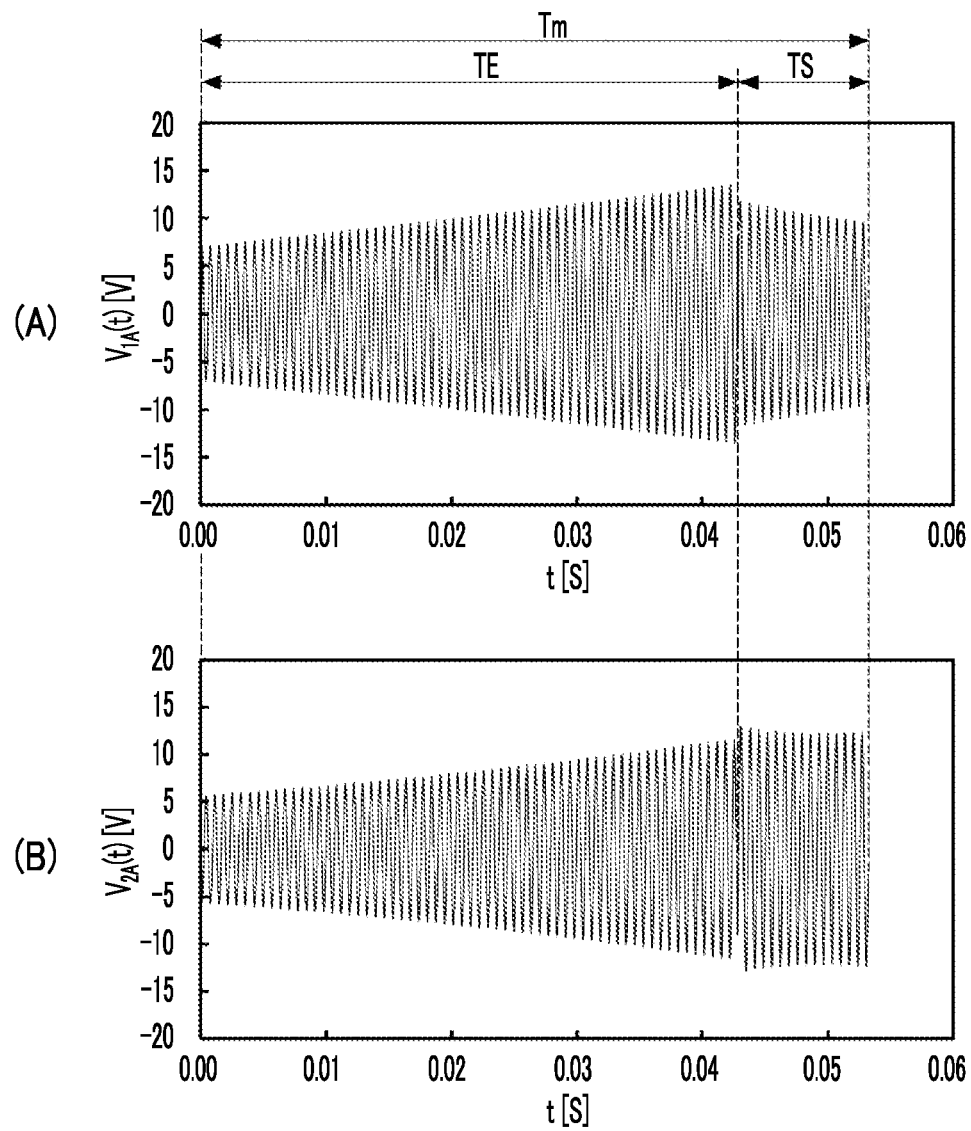
FIG. 14 is a diagram showing changes in the driving voltage waveforms over time in one modulation cycle, where (A) of FIG. 14 shows the waveform of the first driving signal and (B) of FIG. 14 shows the waveform of the second driving signal.

Next, details of experimental results under Condition 1 will be described. FIG. 14 shows changes in the driving voltage waveforms $V_{1A}(t)$ and $V_{2A}(t)$ over time in one modulation cycle $T_m$ used in the experiment under Condition 1. (A) of FIG. 14 shows the driving voltage waveform $V_{1A}(t)$. (B) of FIG. 14 shows the driving voltage waveform $V_{2A}(t)$. Since the driving voltage waveforms $V_{1B}(t)$ and $V_{2B}(t)$ are each inverted versions of the driving voltage waveforms $V_{1A}(t)$ and $V_{2A}(t)$, illustrations thereof are omitted.

The first driving signal consisting of the driving voltage waveforms $V_{1A}(t)$ and $V_{1B}(t)$ shown in (A) of FIG. 14 and the second driving signal consisting of the driving voltage waveforms $V_{2A}(t)$ and $V_{2B}(t)$ shown in (B) of FIG. 14 are provided to the MEMS mirror 2. With the above, the first deflection angle $\theta_1$ and second deflection angle $\theta_2$ of the mirror portion 20 that performs the spiral rotation operation are measured. In reality, in order to prevent a polarization reversal of the first actuator 21 and the second actuator 22, which are the piezoelectric actuators, a negative bias of −15 V is added to each of the driving voltage waveforms.

In the experiment under Condition 1, the filter processing by the frequency filter processing unit 46 is not performed.

Figure 15:
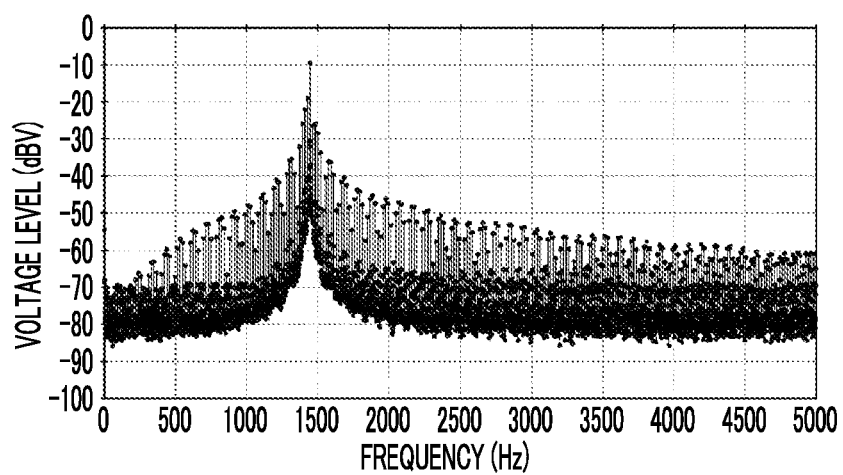
FIG. 15 is a diagram showing a frequency component of a driving voltage waveform.

FIG. 15 shows a frequency component of the driving voltage waveform $V_{1A}(t)$ applied to the first movable portion 21A of the first actuator 21. FIG. 15 is a plot of frequency components obtained by performing Fourier transform on the driving voltage waveform $V_{1A}(t)$. According to FIG. 15, in a case where the filter processing is not performed, it can be seen that there is a voltage component having a voltage level equal to or higher than a certain value in the first frequency range B1 and the second frequency range B2 shown in FIG. 11.

Although a frequency component included in the second driving signal is not shown, the voltage level ratio R is −65 dBV in the second frequency range B2 (range of 9880 Hz to 10920 Hz) including the high-order resonance frequency $f_{r2H}$ (refer to FIG. 7) around the second axis $a_2$, which is a sufficiently small value.

Figure 16:
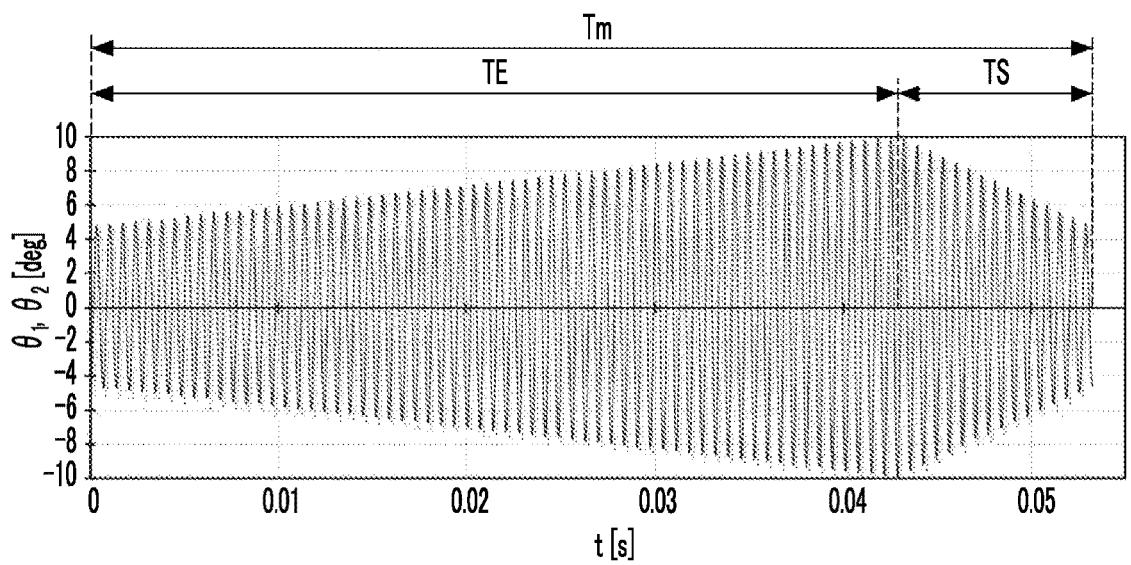
FIG. 16 is a diagram showing measurement results of the first deflection angle and the second deflection angle in one modulation cycle.

FIG. 16 shows measurement results of the first deflection angle $\theta_1$ and the second deflection angle $\theta_2$ in one modulation cycle $T_m$. In FIG. 16, the solid line shows a change in the first deflection angle $\theta_1$ over time, and the broken line shows a change in the second deflection angle $\theta_2$ over time. As shown in FIG. 16, in the expansion period TE and the contraction period TS, a maximum value and minimum value of the first deflection angle $\theta_1$ and a maximum value and minimum value of the second deflection angle $\theta_2$ each change linearly. That is, one modulation cycle $T_m$ includes a period in which the swing amplitude around the first axis $a_1$ and the swing amplitude around the second axis $a_2$ change linearly.

According to FIG. 16, it can be seen that the spiral rotation operation is realized in which the swing amplitude linearly expands in 0.043 seconds and linearly contracts in 0.01 seconds in a range of 5° to 10°.

Figure 17:
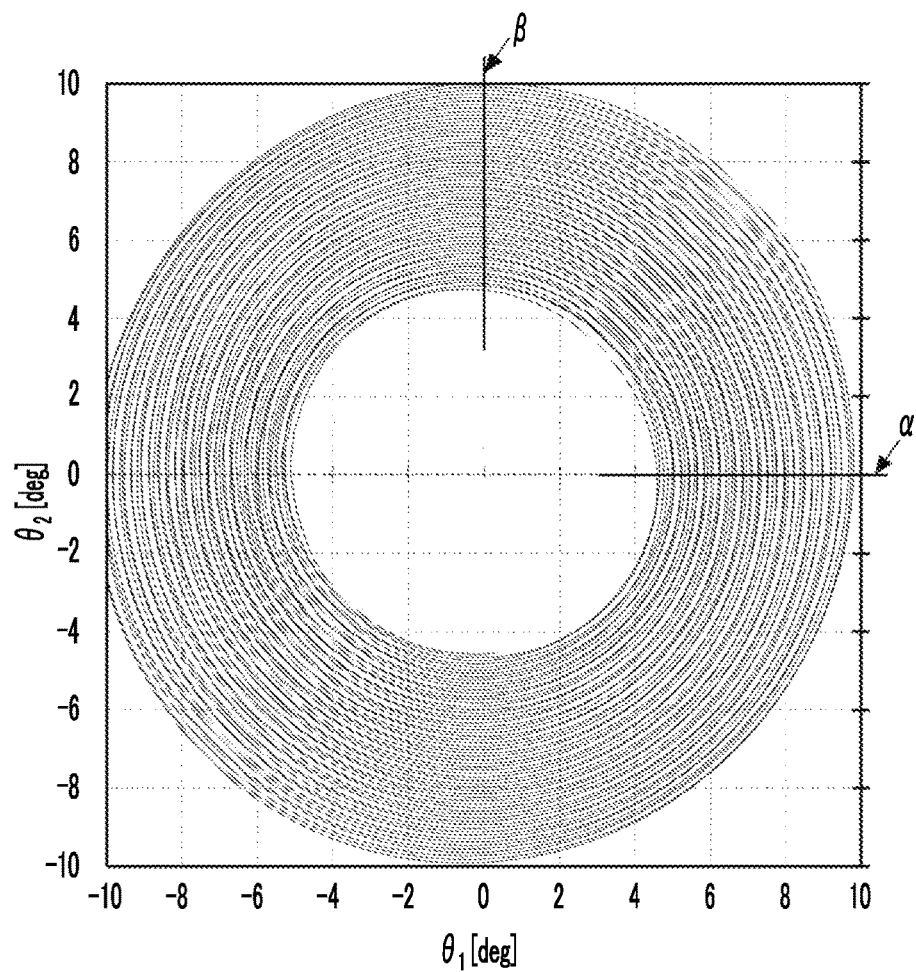
FIG. 17 is a diagram showing measurement results of a spiral orbit during an expansion period within one modulation cycle.

FIG. 17 shows measurement results of the spiral orbit in the expansion period TE within one modulation cycle $T_m$. The variation in the line spacing around the first axis $a_1$ is measured based on the measurement result of the spiral orbit shown in FIG. 17. The variation in the line spacing around the first axis $a_i$ means the variation in the spacing of the spiral orbits crossing a straight line $\alpha$ shown in FIG. 17. A value of the variation in the line spacing in FIG. 12 is a maximum absolute value in a case where an absolute value of a difference between line spacings of adjacent line numbers is calculated for all line numbers.

Figure 18:
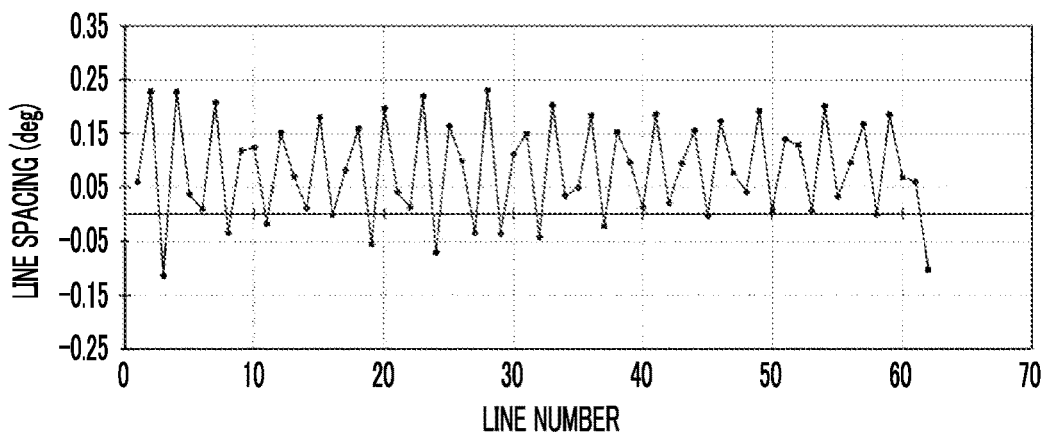
FIG. 18 is a graph showing a measurement result of the line spacing around the first axis.

FIG. 18 shows measurement result of the line spacing around the first axis $a_1$. In FIG. 18, the line spacing on the straight line $\alpha$ is measured and the measured value is plotted with respect to the line number. The line number is a number for identifying a line of the spiral orbit that crosses the straight line $\alpha$. Specifically, the line numbers are numbers assigned in order from the smallest first deflection angle $\theta_1$ with respect to a plurality of lines crossing the straight line $\alpha$.

According to FIG. 18, it can be seen that the variation in the line spacing is large under Condition 1 in which the filter processing is not performed. A maximum value of the variation in the line spacing is 0.342° under Condition 1.

The line spacing around the second axis $a_2$ (line spacing in straight line $\beta$ shown in FIG. 17) has a small variation, and the maximum value of the variation in the line spacing is 0.031°. That is, the variation in the line spacing around the second axis $a_z$ is 1/10 or less of the variation in the line spacing around the first axis $a_1$.

Details of Experimental Results Under Condition 4

Figure 19:
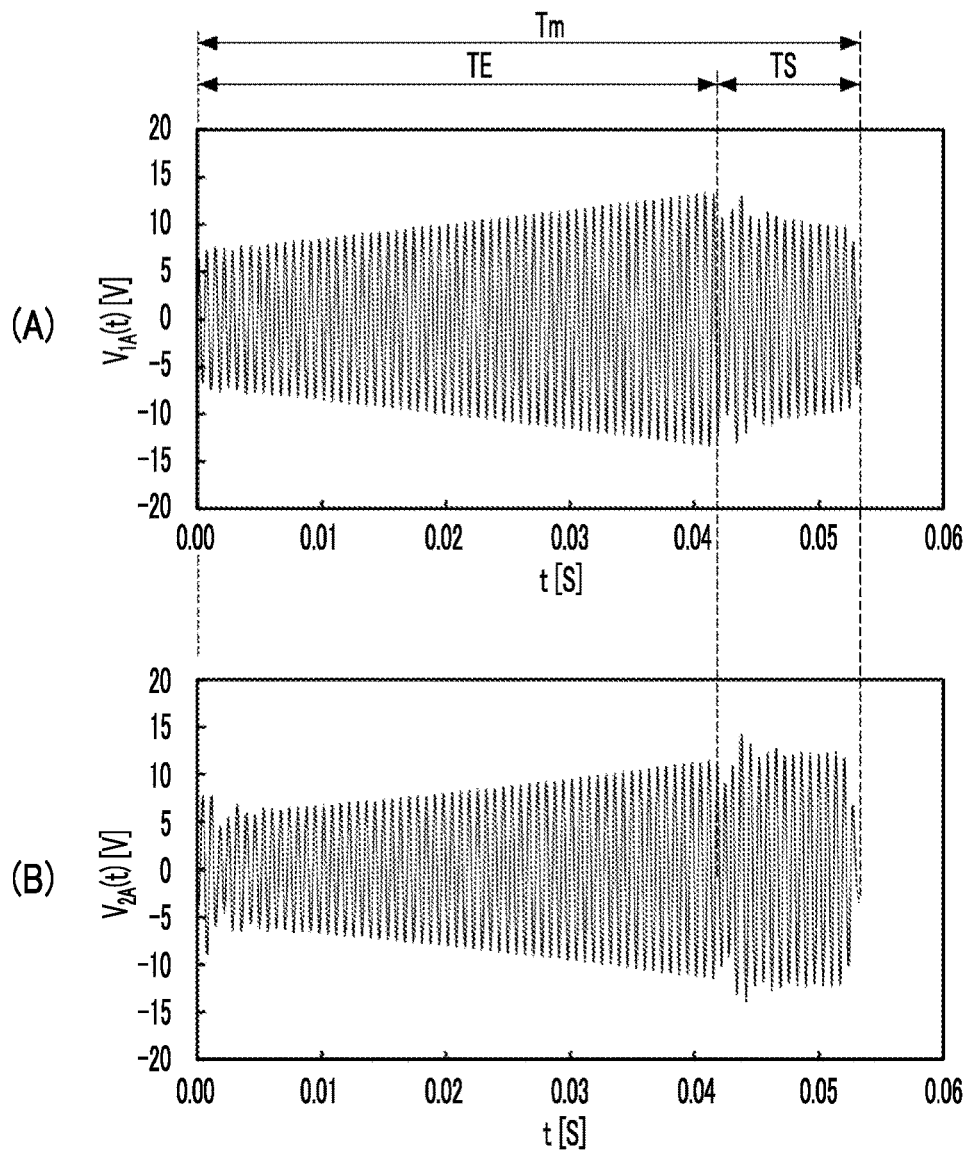
FIG. 19 is a diagram showing changes in driving voltage waveforms over time in one modulation cycle, where (A) of FIG. 19 shows the waveform of the first driving signal and (B) of FIG. 19 shows the waveform of the second driving signal.

Next, details of experimental results under Condition 4 will be described. FIG. 19 shows changes in the driving voltage waveforms $V_{1A}(t)$ and $V_{2A}(t)$ over time in one modulation cycle $T_m$. (A) of FIG. 19 shows the driving voltage waveform $V_{1A}(t)$. (B) of FIG. 19 shows the driving voltage waveform $V_{2A}(t)$. Since the driving voltage waveforms $V_{1B}(t)$ and $V_{2B}(t)$ are each inverted versions of the driving voltage waveforms $V_{1A}(t)$ and $V_{2A}(t)$, illustrations thereof are omitted.

The first driving signal consisting of the driving voltage waveforms $V_{1A}(t)$ and $V_{1B}(t)$ shown in (A) of FIG. 19 and the second driving signal consisting of the driving voltage waveforms $V_{2A}(t)$ and $V_{2B}(t)$ shown in (B) of FIG. 19 are provided to the MEMS mirror 2. With the above, the first deflection angle $\theta_1$ and second deflection angle $\theta_2$ of the mirror portion 20 that performs the spiral rotation operation are measured. In reality, in order to prevent a polarization reversal of the first actuator 21 and the second actuator 22, which are the piezoelectric actuators, a negative bias of −15 V is added to each of the driving voltage waveforms.

In the experiment under Condition 4, the frequency filter processing unit 46 is a Butterworth bandpass filter of order 8 (refer to FIG. 12).

Figure 20:
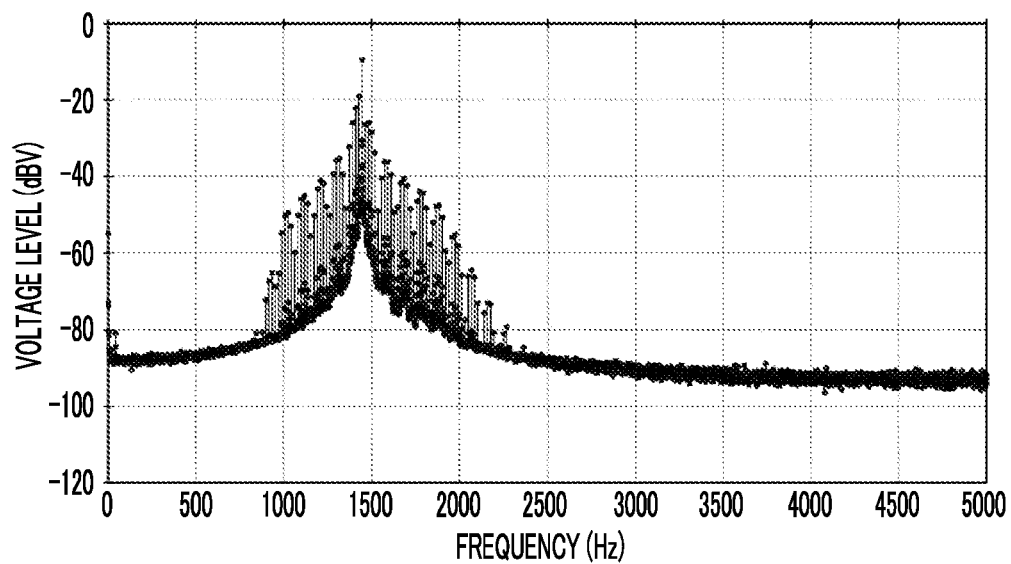
FIG. 20 is a diagram showing a frequency component of a driving voltage waveform.

FIG. 20 shows a frequency component of the driving voltage waveform $V_{1A}(t)$ applied to the first movable portion 21A of the first actuator 21. FIG. 20 is a plot of frequency components obtained by performing Fourier transform on the driving voltage waveform $V_{1A}(t)$. According to FIG. 20, it can be seen that the voltage components in the first frequency range B1 and the second frequency range B2 are significantly reduced by performing the filter processing.

Figure 21:
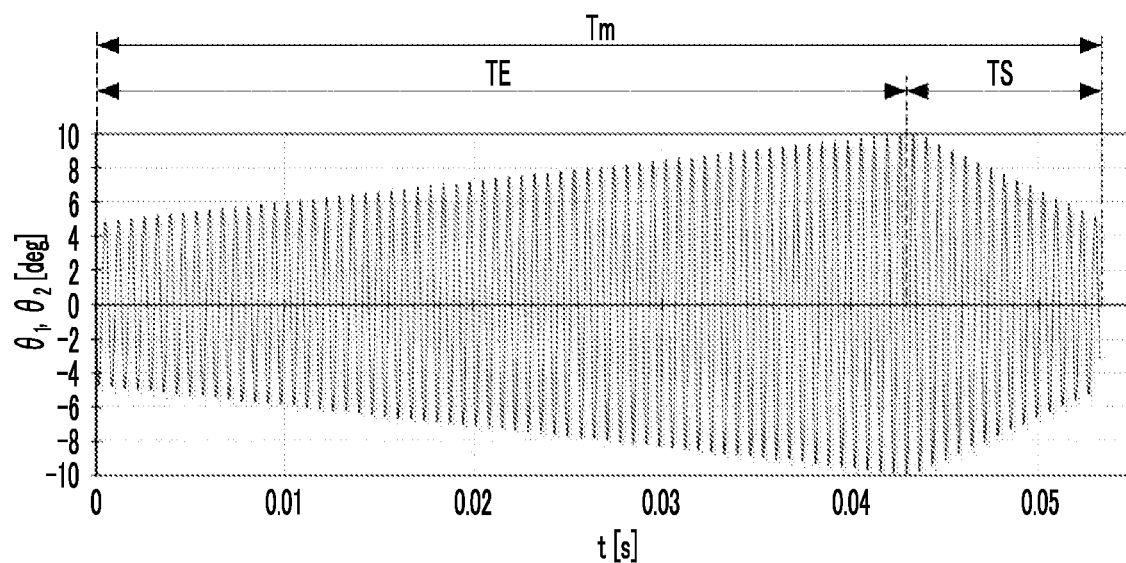
FIG. 21 is a diagram showing measurement results of the first deflection angle and the second deflection angle in one modulation cycle.

FIG. 21 shows measurement results of the first deflection angle $\theta_1$ and the second deflection angle $\theta_2$ in one modulation cycle $T_m$. In FIG. 21, the solid line shows a change in the first deflection angle $\theta_1$ over time, and the broken line shows a change in the second deflection angle $\theta_2$ over time. As shown in FIG. 21, in the expansion period TE and the contraction period TS, a maximum value and minimum value of the first deflection angle $\theta_1$ and a maximum value and minimum value of the second deflection angle $\theta_2$ each change linearly. That is, one modulation cycle $T_m$ includes a period in which the swing amplitude around the first axis $a_1$ and the swing amplitude around the second axis $a_2$ change linearly.

According to FIG. 21, it can be seen that the spiral rotation operation is realized in which the swing amplitude linearly expands in 0.043 seconds and linearly contracts in 0.01 seconds in a range of 5° to 10°.

Figure 22:
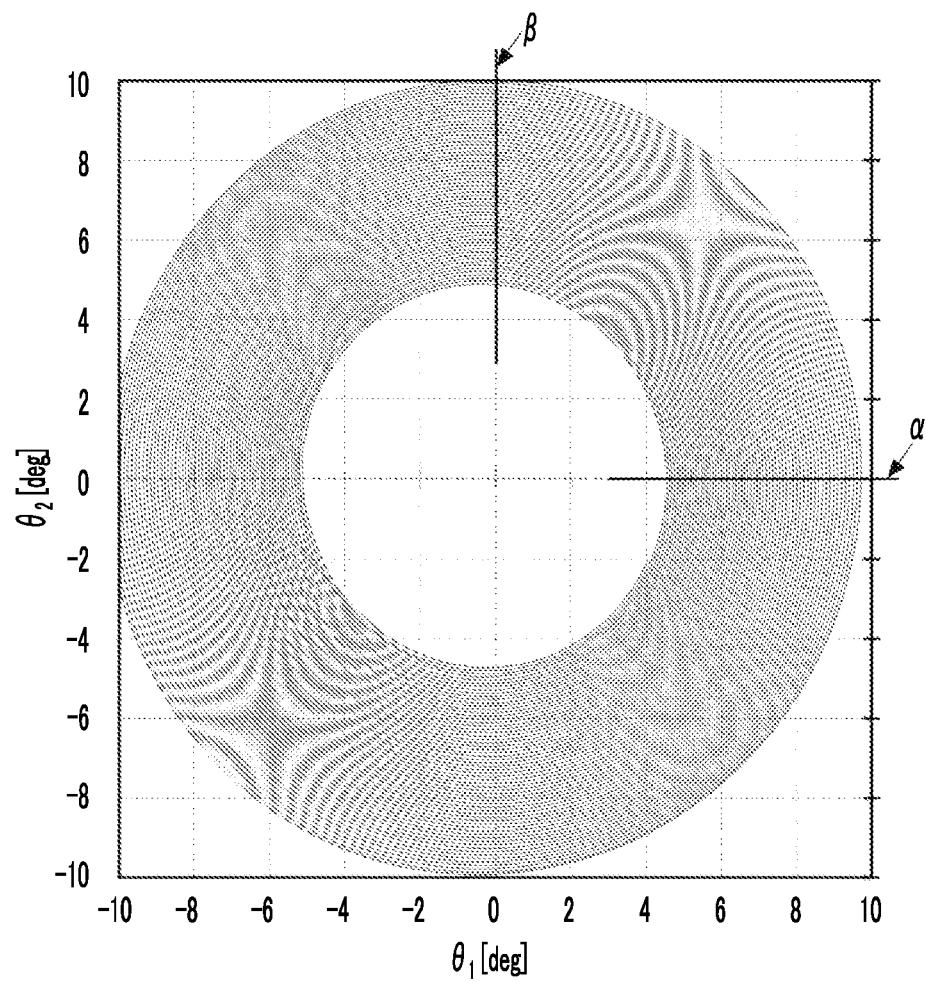
FIG. 22 is a diagram showing measurement results of the spiral orbit during the expansion period within one modulation cycle.

FIG. 22 shows measurement results of the spiral orbit in the expansion period TE within one modulation cycle $T_m$. The variation in the line spacing around the first axis $a_1$ is measured based on the measurement result of the spiral orbit shown in FIG. 22. The variation in the line spacing around the first axis $a_1$ means the variation in the spacing of the spiral orbits crossing a straight line $\alpha$ shown in FIG. 22.

Figure 23:
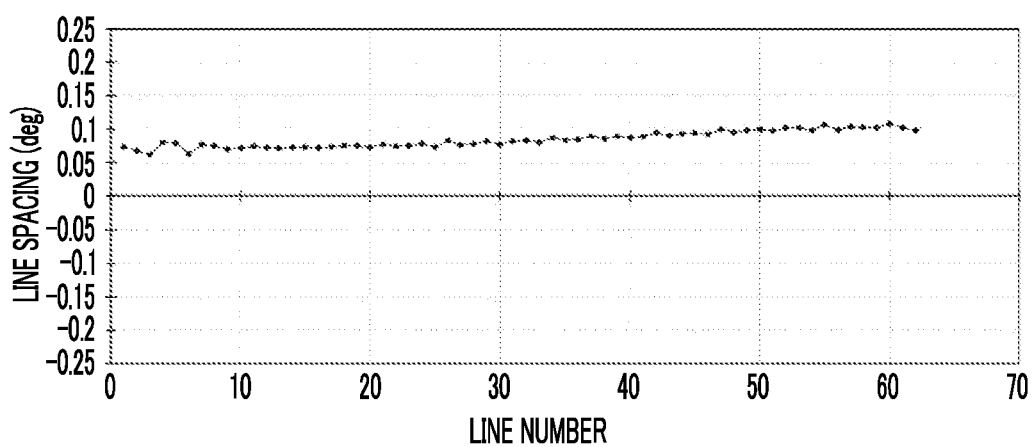
FIG. 23 is a graph showing a measurement result of the line spacing around the first axis.

FIG. 23 shows measurement result of the line spacing around the first axis $a_1$. In FIG. 23, the line spacing on the straight line $\alpha$ is measured and the measured value is plotted with respect to the line number. The line number is a number for identifying a line of the spiral orbit that crosses the straight line $\alpha$. Specifically, the line numbers are numbers assigned in order from the smallest first deflection angle $\theta_1$ with respect to a plurality of lines crossing the straight line $\alpha$.

According to FIG. 23, it can be seen that the variation in the line spacing is reduced under Condition 4, as compared with Condition 1. The maximum value of the variation in the line spacing is 0.0183° under Condition 4.

The line spacing around the second axis $a_2$ (line spacing in straight line $\beta$ shown in FIG. 22) has a small variation, and the maximum value of the variation in the line spacing is 0.021°.

Details of Experimental Results Under Condition 6

Next, details of experimental results under Condition 6 will be described. In the experiment under Condition 6, the frequency filter processing unit 46 is a Butterworth bandpass filter of order 8 and suppresses only the frequency component of the second frequency range B2 among the first frequency range B1 and the second frequency range B2.

Figure 24:
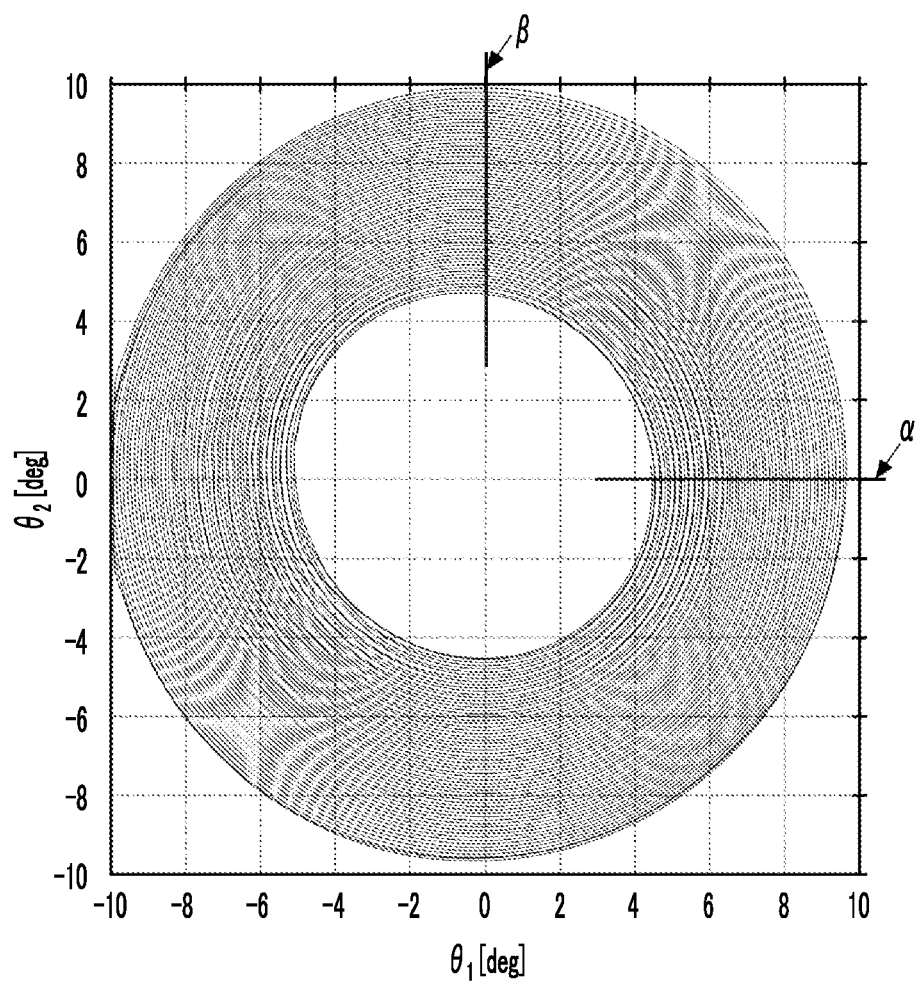
FIG. 24 is a diagram showing measurement results of the spiral orbit during the expansion period within one modulation cycle.

FIG. 24 shows measurement results of the spiral orbit in the expansion period TE within one modulation cycle $T_m$. The variation in the line spacing around the first axis $a_1$ is measured based on the measurement result of the spiral orbit shown in FIG. 24. The variation in the line spacing around the first axis $a_1$ means the variation in the spacing of the spiral orbits crossing a straight line $\alpha$ shown in FIG. 24.

Figure 25:
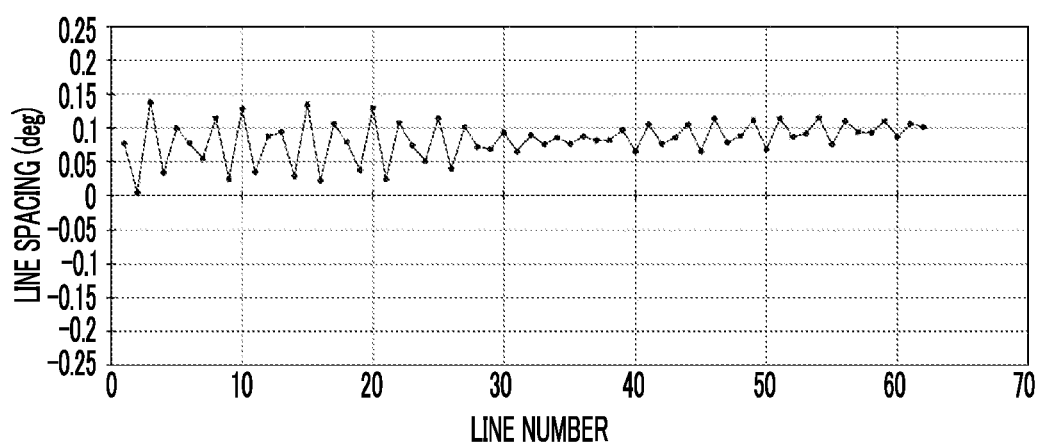
FIG. 25 is a graph showing a measurement result of the line spacing around the first axis.

FIG. 25 shows measurement result of the line spacing around the first axis $a_1$. In FIG. 25, the line spacing on the straight line α is measured and the measured value is plotted with respect to the line number. The line number is a number for identifying a line of the spiral orbit that crosses the straight line α. Specifically, the line numbers are numbers assigned in order from the smallest first deflection angle $θ_1$ with respect to a plurality of lines crossing the straight line α.

According to FIG. 25, the variation in line spacing is reduced under Condition 6, as compared with Condition 1, but the variation in line spacing is large in an area where the line number is small and the maximum value thereof is 0.15°. This is due to the excitation of the unnecessary resonance mode on the lower-frequency side than the basic resonance mode in the resonance mode accompanied by the mirror tilt swing around the first axis $a_1$.

In the above embodiment, the frequency filter processing unit 46 is provided in the mirror driving unit 44, but the frequency filter processing unit 46 may not be provided. That is, the frequency filter processing unit 46 may not be provided, and the driving signal generated by the driving signal generation unit 45 may satisfy the relationship of R≤−55 dBV.

The configuration of the MEMS mirror 2 shown in the above embodiment can be changed as appropriate. For example, in the above embodiment, the first actuator 21 and the second actuator 22 have the annular shape, but one or both of the first actuator 21 and the second actuator 22 may have a meander structure. A support member having a configuration other than the torsion bar may be used as the first support portion 24 and the second support portion 25.

The hardware configuration of the driving controller 4 can be modified in various ways. The processing unit of the driving controller 4 may be configured of one processor or a combination of two or more processors of the same type or different types (for example, a combination of a plurality of field programmable gate arrays (FPGAs), and/or a combination of a CPU and an FPGA).

All documents, patent applications, and technical standards described in the present specification are incorporated by reference in the present specification to the same extent as in a case where the incorporation of each individual document, patent application, and technical standard by reference is specifically and individually described.

What is claimed is:

1. An optical scanning device comprising:
    a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion; and
    a processor that provides a first driving signal to the first actuator and provides a second driving signal to the second actuator,
    wherein the processor causes the mirror portion to perform a spiral rotation operation with the first driving signal and the second driving signal as cyclic voltage signals,
    a resonance mode of one lower order than a basic resonance mode closest to a frequency of the cyclic voltage signal exists in at least any one of a plurality of resonance modes accompanied by a mirror tilt swing around the first axis or a plurality of resonance modes accompanied by the mirror tilt swing around the second axis, and
    in a case where a resonance frequency of one lower order from a frequency of the basic resonance mode is $f_{rL}$ and a resonance frequency of one higher order from the frequency of the basic resonance mode is $f_{rH}$ for each axis, a ratio of a first voltage level to a second voltage level which is a maximum voltage level value in the entire frequency range among frequency components of the cyclic voltage signal is satisfied to be −55 dBV or less,
    where a maximum voltage level value in a frequency range of $(1±1/20)×f_{rL}$ and a frequency range of $(1±1/20)×f_{rH}$ among the frequency components of the cyclic voltage signal is the first voltage level for an axis in which the lower-order resonance mode exists among the first axis and the second axis, and a maximum voltage level value in the frequency range of $(1±1/20)×f_{rH}$ among the frequency components of the cyclic voltage signal is the first voltage level for an axis in which the lower-order resonance mode does not exist among the axes.

2. The optical scanning device according to claim 1, wherein in the basic resonance mode of the axis in which the lower-order resonance mode exists, an actuator that drives the mirror portion around the axis in which the lower-order resonance mode exists among the first actuator and the second actuator and the mirror portion swing in a relationship of opposite phases to each other.

3. The optical scanning device according to claim 1, wherein the processor performs frequency filter processing on the first driving signal and the second driving signal to set the ratio of the first voltage level to the second voltage level to −55 dBV or less.

4. The optical scanning device according to claim 3, wherein the frequency filter processing is digital filter processing or analog filter processing.

5. The optical scanning device according to claim 1, wherein the cyclic voltage signal is a signal whose amplitude and phase change over time.

6. The optical scanning device according to claim 1, wherein the spiral rotation operation includes a period in which a swing amplitude around the first axis and a swing amplitude around the second axis of the mirror portion linearly change, respectively.

7. A control method of an optical scanning device that includes a mirror device that has a mirror portion, which is swingable around a first axis and a second axis orthogonal to each other, having a reflecting surface reflecting incident light, a first actuator causing the mirror portion to swing around the first axis by applying a rotational torque around the first axis to the mirror portion, and a second actuator causing the mirror portion to swing around the second axis by applying a rotational torque around the second axis to the mirror portion, the control method comprising:
    causing the mirror portion to perform a spiral rotation operation with a first driving signal applied to the first actuator and a second driving signal applied to the second actuator as cyclic voltage signals,
    wherein a resonance mode of one lower order than a basic resonance mode closest to a frequency of the cyclic voltage signal exists in at least any one of a plurality of resonance modes accompanied by a mirror tilt swing around the first axis or a plurality of resonance modes accompanied by the mirror tilt swing around the second axis, and in a case where a resonance frequency of one lower order from a frequency of the basic resonance mode is $f_{rL}$ and a resonance frequency of one higher order from the frequency of the basic resonance mode is $f_{rH}$ for each axis, a ratio of a first voltage level to a second voltage level which is a maximum voltage level value in the entire frequency range among frequency components of the cyclic voltage signal is satisfied to be −55 dBV or less, where a maximum voltage level value in a frequency range of $(1\pm\frac{1}{20})\times f_{rL}$ and a frequency range of $(1\pm\frac{1}{20})\times f_{rH}$ among the frequency components of the cyclic voltage signal being the first voltage level for an axis in which the lower-order resonance mode exists among the first axis and the second axis, and a maximum voltage level value in the frequency range of $(1\pm\frac{1}{20})\times f_{rH}$ among the frequency components of the cyclic voltage signal being the first voltage level for an axis in which the lower-order resonance mode does not exist among the axes.

* * * * *